(12) United States Patent
Takanashi et al.

(10) Patent No.: US 8,818,648 B2
(45) Date of Patent: Aug. 26, 2014

(54) HYBRID CONSTRUCTION MACHINE

(75) Inventors: Kyoko Takanashi, Kanagawa (JP);
Hideaki Yuasa, Kanagawa (JP);
Kiminori Sano, Chiba (JP)

(73) Assignees: Sumitomo Heavy Industries, Ltd.,
Tokyo (JP); **Sumitomo (S.H.I.)
Construction Machinery Co., Ltd.**,
Tokyo (JP)

( * ) Notice: Subject to any disclaimer, the term of this patent is extended or adjusted under 35 U.S.C. 154(b) by 440 days.

(21) Appl. No.: 13/131,944

(22) PCT Filed: Dec. 1, 2009

(86) PCT No.: PCT/JP2009/070167
§ 371 (c)(1),
(2), (4) Date: May 31, 2011

(87) PCT Pub. No.: WO2010/064625
PCT Pub. Date: Jun. 10, 2010

(65) Prior Publication Data
US 2011/0264337 A1    Oct. 27, 2011

(30) Foreign Application Priority Data

Dec. 1, 2008 (JP) ................... 2008-306731
Jan. 20, 2009 (JP) ................... 2009-010257

(51) Int. Cl.
*B60W 10/00* (2006.01)
*B60W 20/00* (2006.01)
*G06F 19/00* (2011.01)
*B60W 50/035* (2012.01)
*F02D 29/04* (2006.01)
*E02F 9/20* (2006.01)
*E02F 9/22* (2006.01)
*F02D 29/06* (2006.01)
*H02J 7/00* (2006.01)
*F02B 3/06* (2006.01)

(52) U.S. Cl.
CPC ............. *F02D 29/06* (2013.01); *B60W 50/035* (2013.01); *F02D 29/04* (2013.01); *B60W 20/00* (2013.01); *E02F 9/2075* (2013.01); *E02F 9/2246* (2013.01); *H02J 7/00* (2013.01); *F02B 3/06* (2013.01); *E02F 9/2025* (2013.01); *B60Y 2200/412* (2013.01); *Y10S 903/902* (2013.01)
USPC ... 701/50; 701/1; 701/39; 701/49; 180/65.21; 180/65.265; 180/65.27; 180/65.275; 180/65.28; 903/902

(58) Field of Classification Search
USPC ......................... 701/1, 36, 49, 50; 180/65.21, 180/65.265–65.29; 172/1, 2, 25; 37/902; 903/902
See application file for complete search history.

(56) References Cited

U.S. PATENT DOCUMENTS
5,077,973 A * 1/1992 Suzuki et al. ................... 60/428
(Continued)

FOREIGN PATENT DOCUMENTS
JP    10-103112    4/1998
JP    2005-299102    10/2005
(Continued)

OTHER PUBLICATIONS
International Search Report mailed on Mar. 9, 2010.

*Primary Examiner* — Jack W Keith
*Assistant Examiner* — Chuong P Nguyen
(74) *Attorney, Agent, or Firm* — IPUSA, PLLC

(57) ABSTRACT

A hybrid construction machine includes a hydraulic pressure work element driven by hydraulic pressure generated by driving power of an internal combustion engine or a motor generator, and also includes an electric-motor work element driven by an electric motor. A superordinate control unit generates a control command which controls drive of the hydraulic pressure work element and the electric-motor work element. A subordinate control unit controls drive of the hydraulic pressure work element and the electric-motor work element based on the control command generated by the superordinate control unit. The subordinate control unit monitors an error in the superordinate control unit.

18 Claims, 14 Drawing Sheets

(56) References Cited

U.S. PATENT DOCUMENTS

| | | | |
|---|---|---|---|
| 5,884,205 A * | 3/1999 | Elmore et al. | 701/50 |
| 6,851,207 B2 * | 2/2005 | Yoshimatsu | 37/348 |
| 7,525,206 B2 * | 4/2009 | Kagoshima et al. | 290/40 C |
| 7,685,816 B2 * | 3/2010 | Yabuki | 60/456 |
| 8,639,404 B2 * | 1/2014 | Sugiyama et al. | 701/22 |
| 2003/0158635 A1 * | 8/2003 | Pillar et al. | 701/1 |
| 2007/0186451 A1 | 8/2007 | Yoshimatsu | |
| 2008/0219866 A1 * | 9/2008 | Kwong et al. | 417/410.1 |
| 2011/0251746 A1 * | 10/2011 | Wu et al. | 701/22 |
| 2012/0296574 A1 * | 11/2012 | Ooki et al. | 702/35 |

FOREIGN PATENT DOCUMENTS

| | | | |
|---|---|---|---|
| JP | 2007228721 A * | 9/2007 | B60K 6/04 |
| JP | 2008-088660 | 4/2008 | |
| WO | WO 2005/095719 | 10/2005 | |

* cited by examiner

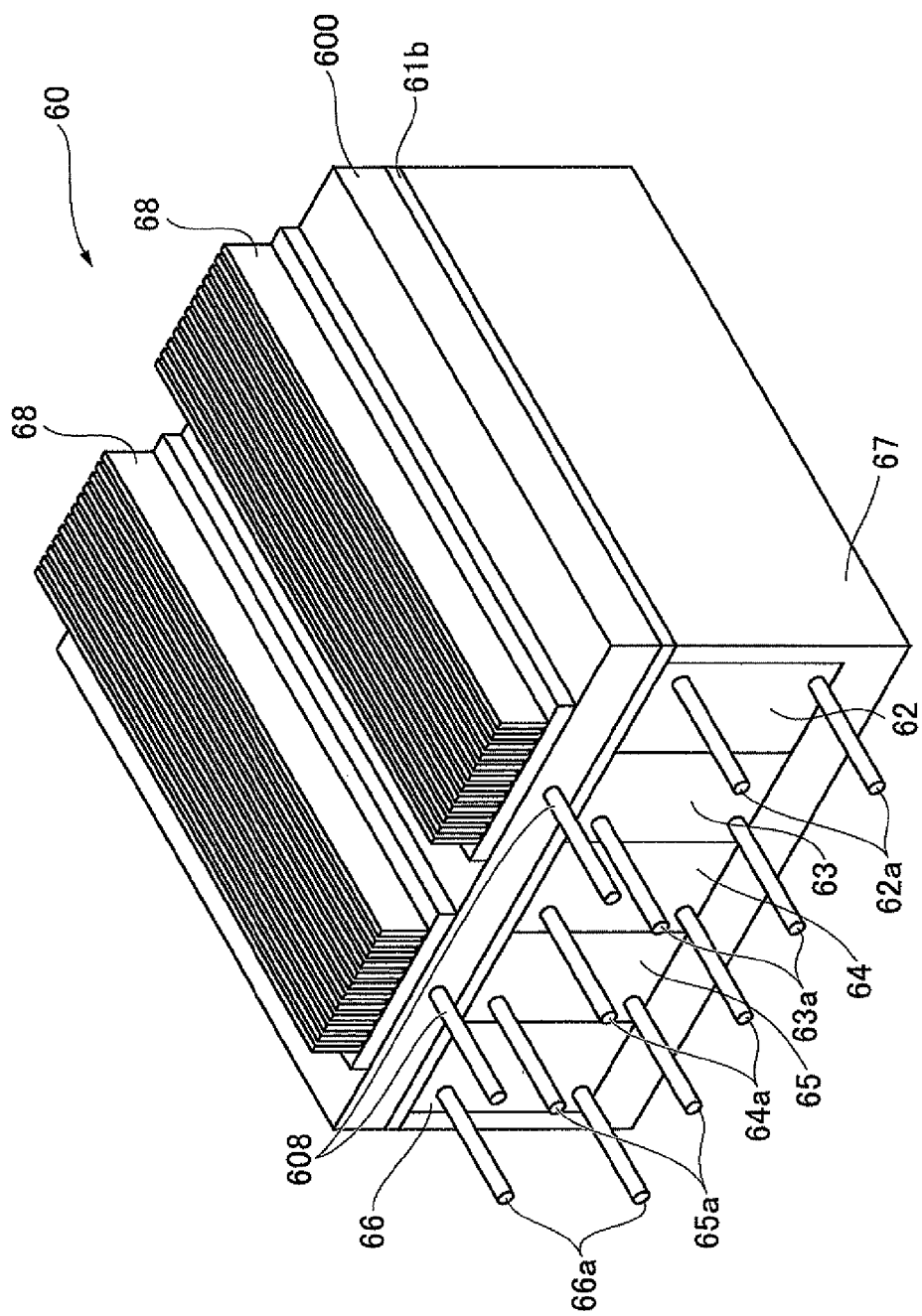

HYBRID CONSTRUCTION MACHINE

TECHNICAL FIELD

The present disclosure generally relates to construction machines, and more particularly to a hybrid construction machine including an electric-motor work element and a hydraulic pressure work element.

BACKGROUND ART

Conventionally, a hybrid construction machine in which a part of a drive mechanism is driven by an electric motor is proposed. The construction machine of this type generally includes a hydraulic pump for carrying out a hydraulic pressure drive of a hydraulic pressure work element, such as a boom, an arm, a bucket, etc. A motor generator is connected to an engine for driving the hydraulic pump via a reduction gear. The motor generator operates to assist the engine drive and to generate electricity by using the power generated by the engine, and the obtained electric power is accumulated in a storage battery.

A turning device for turning an upper turning part includes an electric motor in addition to a hydraulic motor as the source of power. The drive of the hydraulic motor is assisted by the electric motor when accelerating the turning device. When decelerating the turning device, the electric motor performs regeneration operation, and the obtained electric power by the regeneration is accumulated in a battery. (For example, see Patent Document 1 below).

There is also a hybrid construction machine which further includes an alternating current motor for driving the work element, such as the turning device, and for driving the hydraulic pump. For example, a turning type construction machine using an electric motor as a source of a turning drive is proposed (see Patent Document 2 below).

RELATED ART DOCUMENTS

Patent Documents

Patent Document 1: Japanese Laid-Open Patent Publication No. 10-103112
Patent Document 2: Japanese Laid-Open Patent Publication No. 2005-299102

DISCLOSURE OF THE INVENTION

Problem to be Solved by the Invention

There is a hybrid construction machine which includes a superordinate control unit and a subordinate control unit as a control system that controls an electric-motor work element, such as a motor generator, a hydraulic pressure work element, or a cooling system. The subordinate control unit controls drive of the electric-motor work element, the hydraulic pressure work element, or the cooling system based on a drive command generated by the superordinate control unit. However, when an error, such as a malfunction, arises in the superordinate control unit of this hybrid construction machine, any countermeasure is not taken.

There are two different countermeasures to be taken when an error arises in the hybrid construction machine: one is to continue operation of the hybrid construction machine, and the other is to suspend operation of the hybrid construction machine. Which of the countermeasures should be taken depends on the location where an error has occurred, or the condition of a defective part.

Accordingly, in one aspect, the present disclosure provides a hybrid construction machine in which, even if an error arises in the superordinate control unit, the subordinate control unit is able to detect the error in the superordinate control unit and perform an appropriate control process according to the kind of the error, and thereby improving the working efficiency.

Means for Solving the Problem

In an embodiment which solves or reduces one or more of the above-mentioned problems, the present disclosure provides a hybrid construction machine including a hydraulic pressure work element driven by hydraulic pressure generated by driving power of an internal combustion engine or a motor generator, and an electric-motor work element driven by an electric motor, the hybrid construction machine including: a superordinate control unit to generate a control command which controls drive of the hydraulic pressure work element and the electric-motor work element; and a subordinate control unit to control drive of the hydraulic pressure work element and the electric-motor work element based on the control command generated by the superordinate control unit, wherein the subordinate control unit monitors an error in the superordinate control unit.

Effects of the Invention

According to one embodiment of the present disclosure, the subordinate control unit can detect an error in the superordinate control unit, and, even if an error arises in the superordinate control unit, the subordinate control unit is arranged to perform a control process according to the kind of the error, and thus the working efficiency can be improved.

BRIEF DESCRIPTION OF THE DRAWINGS

FIG. 9 is a perspective view of a servo control unit in the hybrid construction machine of the fourth embodiment.

BEST MODE FOR CARRYING OUT THE INVENTION

A description will now be given of embodiments of the present disclosure with reference to the accompanying drawings.

Figure 1:
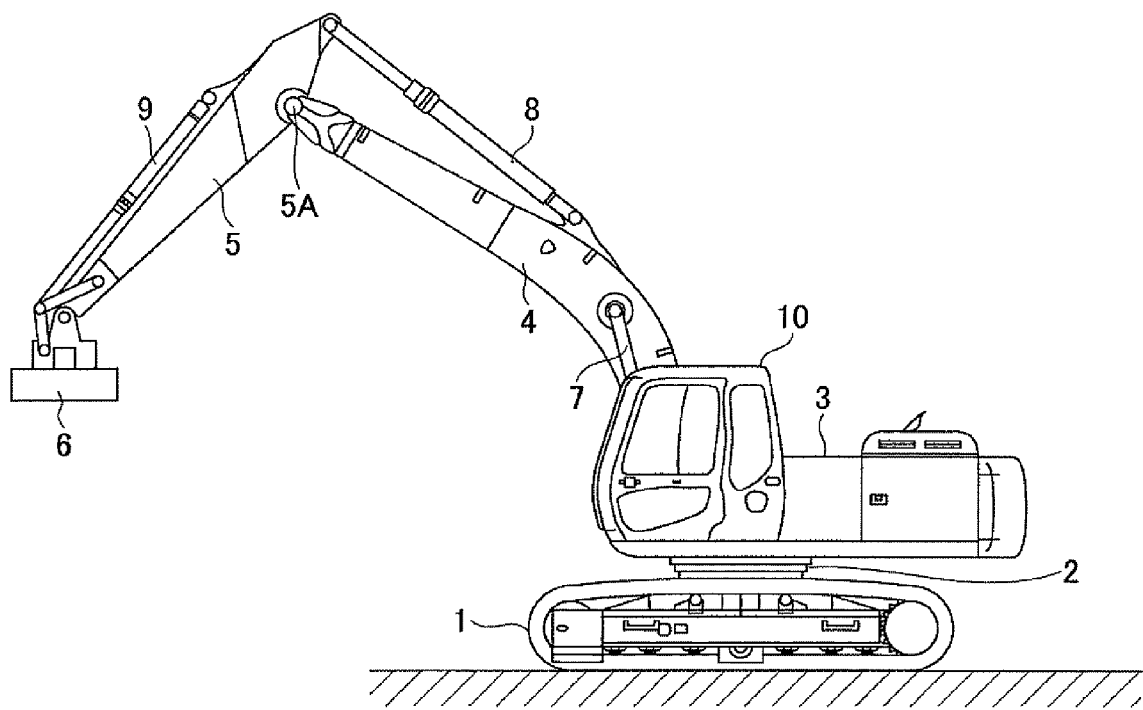
FIG. 1 is a side view of a lifting magnet type hydraulic excavator in which a hybrid construction machine of a first embodiment of the present disclosure is incorporated.

FIG. 1 is a side view of a lifting magnet type hydraulic excavator in which a hybrid construction machine of a first embodiment of the present disclosure is incorporated.

In the lifting magnet type hydraulic excavator, an upper turning part 3 is carried on a lower running part 1 through a turning device 2. On the upper turning part 3, a boom 4, an arm 5, and a lifting magnet 6 are carried. The boom 4, the arm 5, and the lifting magnet 6 are driven by hydraulic pressure of a boom cylinder 7, an arm cylinder 8, and a bucket cylinder 9, respectively. Moreover, a cabin 10 in which an operator seat and an operation device are arranged, and the sources of power, such as an engine, are carried on the upper turning part 3.

Figure 2:
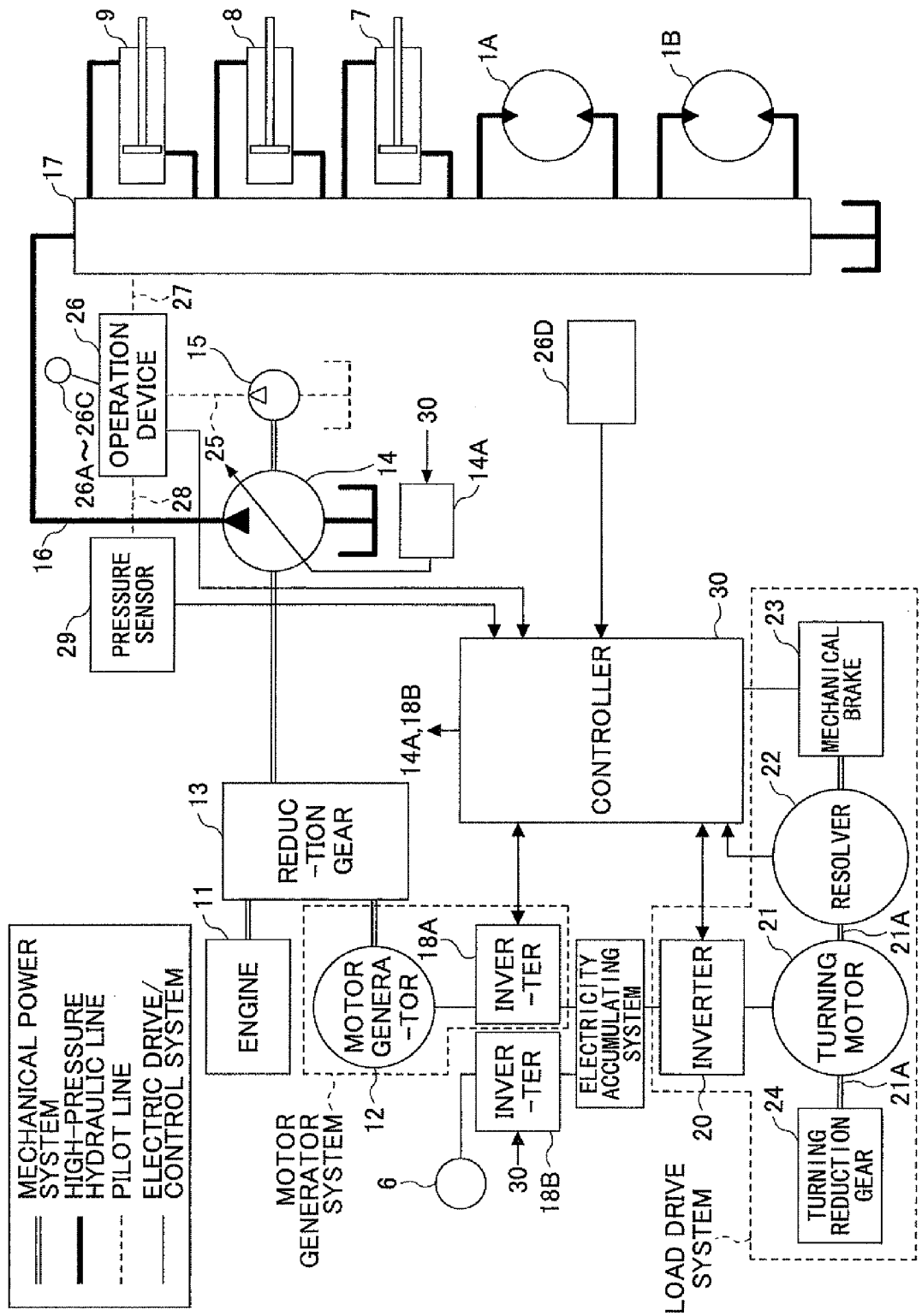
FIG. 2 is a block diagram showing the composition of the lifting magnet type hydraulic excavator of the first embodiment.

FIG. 2 is a block diagram showing the composition of the lifting magnet type hydraulic excavator. In FIG. 2, the double line denotes a mechanical power system, the bold line denotes a high-voltage hydraulic line, the dashed line denotes a pilot line, and the solid line denotes an electric drive/control system, respectively.

An engine 11 as a mechanical drive part, and a motor generator 12 as an assist drive part are connected to the input axes of a reduction gear 13, and the reduction gear 13 functions as a speed increasing gear or a speed reducing gear. A main pump 14 and a pilot pump 15 are connected to the output axis of the reduction gear 13. A control valve 17 is connected to the main pump 14 via a high-voltage hydraulic line 16.

The control valve 17 is a control device which controls a hydraulic pressure system. A hydraulic motor 1A (for right side drive) and a hydraulic motor 1B (for left side drive) for moving the lower running part 1, the boom cylinder 7, the arm cylinder 8, and the bucket cylinder 9 are connected to the control valve 17 via the high-voltage hydraulic line.

A battery 19 as a storage battery is connected to the motor generator 12 via an inverter 18A and an up-down voltage converter 100. The inverter 18A and the up-down voltage converter 100 are interconnected by a DC bus 110. An electricity accumulating system is constituted by the battery 19 and the up-down voltage converter 100. An electric power generating system is constituted by the motor generator 12 and the inverter 18A.

The lifting magnet 6 is connected to the DC bus 110 via an inverter 18B. A turning motor 21 as an electric-motor work element is also connected to the DC bus 110 via an inverter 20. The DC bus 110 is provided to deliver and receive electric power between the battery 19, the motor generator 12, the lifting magnet 6, and the turning motor 21.

A DC bus voltage detector 111 for detecting a voltage value of the DC bus 110 (which is called a DC bus voltage value) is provided in the DC bus 110. A DC bus voltage value detected by the DC bus voltage detector 111 is supplied to a controller 30.

A battery voltage detector 112 for detecting a voltage value of the battery and a battery current detector 113 for detecting a current value of the battery are arranged in the battery 19. A battery voltage value and a battery current value which are detected by the detector 112 and the detector 113 are supplied to the controller 30.

A resolver 22, a mechanical brake 23, and a turning reduction gear 24 are connected to a rotary shaft 21A of the turning motor 21. An operation device 26 is connected to the pilot pump 15 via a pilot line 25. A load drive system is constituted by the turning motor 21, the inverter 20, the resolver 22, and the turning reduction gear 24.

The operation device 26 includes a lever 26A, lever 26B, a pedal 26C, and a button switch 26D. The control valve 17 and the pressure sensor 29 are connected to the lever 26A, the lever 26B, and the pedal 26C via a hydraulic line 27 and a hydraulic line 28, respectively. The controller 30 which controls drive of the electric system of the construction machine of the first embodiment is connected to the pressure sensor 29.

The above-described lifting magnet type hydraulic excavator is a hybrid construction machine which uses the engine 11, the motor generator 12, and the turning motor 21 as the sources of power. These sources of power are carried on the upper turning part 3 shown in FIG. 1. In the following, the respective parts of the lifting magnet type hydraulic excavator will be described.

The engine 11 is, for example, an internal combustion engine which is formed by a diesel engine, and the output axis thereof is connected to one of the two input axes of the reduction gear 13. The engine 11 is always operated during operation of the lifting magnet type hydraulic excavator. Operation of the engine 11 is controlled by an ECU (electronic control unit) 11A.

The motor generator 12 is a motor capable of operating in each of a motor-driven (motor-assisted) mode and an electric power generating mode. In this embodiment, a motor generator which is driven by AC (alternating current) through the inverter 20 is used as the motor generator 12. For example, the motor generator 12 may be formed from an IPM (interior permanent magnet) motor in which a magnet is embedded in the inside of a rotor. The rotary shaft of the motor generator 12 is connected to the other of the input axes of the reduction gear 13.

The reduction gear 13 includes two input axes and one output axis. The driving shaft of the engine 11 and the driving shaft of the motor generator 12 are connected to the input axes of the reduction gear 13 respectively. The driving shaft of the main pump 14 is connected to the output axis of the reduction gear 13. When the load of the engine 11 is large, the motor generator 12 performs the motor-driven (motor-assisted) operation, and the driving power of the motor generator 12 is transmitted to the main pump 14 through the output axis of the reduction gear 13. Thereby, the drive of the engine 11 is assisted.

On the other hand, when the load of the engine 11 is small, the motor generator 12 performs the electric power generating operation by transmitting the driving power of the engine 11 to the motor generator 12 through the reduction gear 13. The switching of the motor-driven operation and the electrical power generation operation of the motor generator 12 is performed by the controller 30 according to the load of the engine 11.

The main pump 14 is a pump which generates hydraulic pressure to be supplied to the control valve 17. A pump control part 14A is connected to the main pump 14 to control a tilting angle of the pump. The pump control part 14A is electrically driven by the controller 30, and the tilting angle of the main pump 14 is controlled. The voltage oil discharged from the main pump 14 is supplied so that each of the hydraulic motors 1A and 1B, the boom cylinder 7, the arm cylinder 8, and the bucket cylinder 9 is driven through the control valve 17.

The pilot pump 15 is a pump which generates pilot voltage required for the hydraulic operation system. The composition of the hydraulic operation system will be described later.

The control valve 17 is a hydraulic pressure control device which controls the hydraulic pressure being supplied to each of the hydraulic motors 1A and 1B, the boom cylinder 7, the arm cylinder 8, and the bucket cylinder 9 (which are connected via the high-voltage hydraulic line for the lower running part 1) according to the manipulation input by the operator.

The inverter 18A is arranged between the motor generator 12 and the up-down voltage converter 100 to control operation of the motor generator 12 in response to the control command from the controller 30. When the inverter 18A controls the power generating operation of the motor generator 12, the required electric power from the battery 18 is supplied to the motor generator 12 via the up-down voltage converter 100 and the DC bus 110. When the inverter 18A controls the regeneration operation of the motor generator 12, the electric power generated by the motor generator 12 is charged via the DC bus 110 and the up-down voltage converter 100 to the battery 19.

The inverter 18B is arranged between the lifting magnet 6 and the up-down voltage converter 100. When turning ON the electromagnet, the inverter 18B supplies the required electric power from the DC bus 110 to the lifting magnet 6 in response to the control command from the controller 30. When turning OFF the electromagnet, the inverter 18B supplies the revived electric power to the DC bus 100.

The battery 19 as a power supply is connected to each of the inverters 18A and 18B and the inverter 20 via the up-down voltage converter 100. When at least one of the motor-driven (motor-assisted) operation of the motor generator 12 and the power operation of the turning motor 21 is performed, the electric power required for the motor-driven (motor-assisted) operation or the power operation is supplied from the battery 19. On the other hand, when at least one of the generating operation of the motor generator 12 and the regeneration operation of the turning motor 21 is performed, the electric power generated by generation or regeneration operation is stored in the battery 19 as electrical energy.

The control of charging/discharging of the battery 19 is performed by the up-down voltage converter 100 based on the charging state of the battery 19, the operational status (the motor-driven operation or the generating operation) of the motor generator 12, the operational status of the lifting magnet 6, and the operational status (the power operation or the regeneration operation) of the turning motor 21. The control of switching of the voltage raising and the voltage lowering of the up-down voltage converter 100 is performed by the controller 30 based on the DC bus voltage value detected by the DC bus voltage detector 111, the battery voltage value detected by the battery voltage detector 112, and the battery current value detected by the battery current detector 113.

The inverter 20 is arranged between the turning motor 21 and the up-down voltage converter 100 to control operation of the turning motor 21 based on the control command from the controller 30. When controlling operation of the power generating of the turning motor 21, the inverter supplies the required electric power from the battery 19 to the turning motor 21 via the up-down voltage converter 100. On the other hand, when controlling the regeneration operation of the turning motor 21, the inverter supplies the electric power generated by the turning motor 21 to the battery 19 via the up-down voltage converter 100, and the battery 19 is charged.

Figure 3:
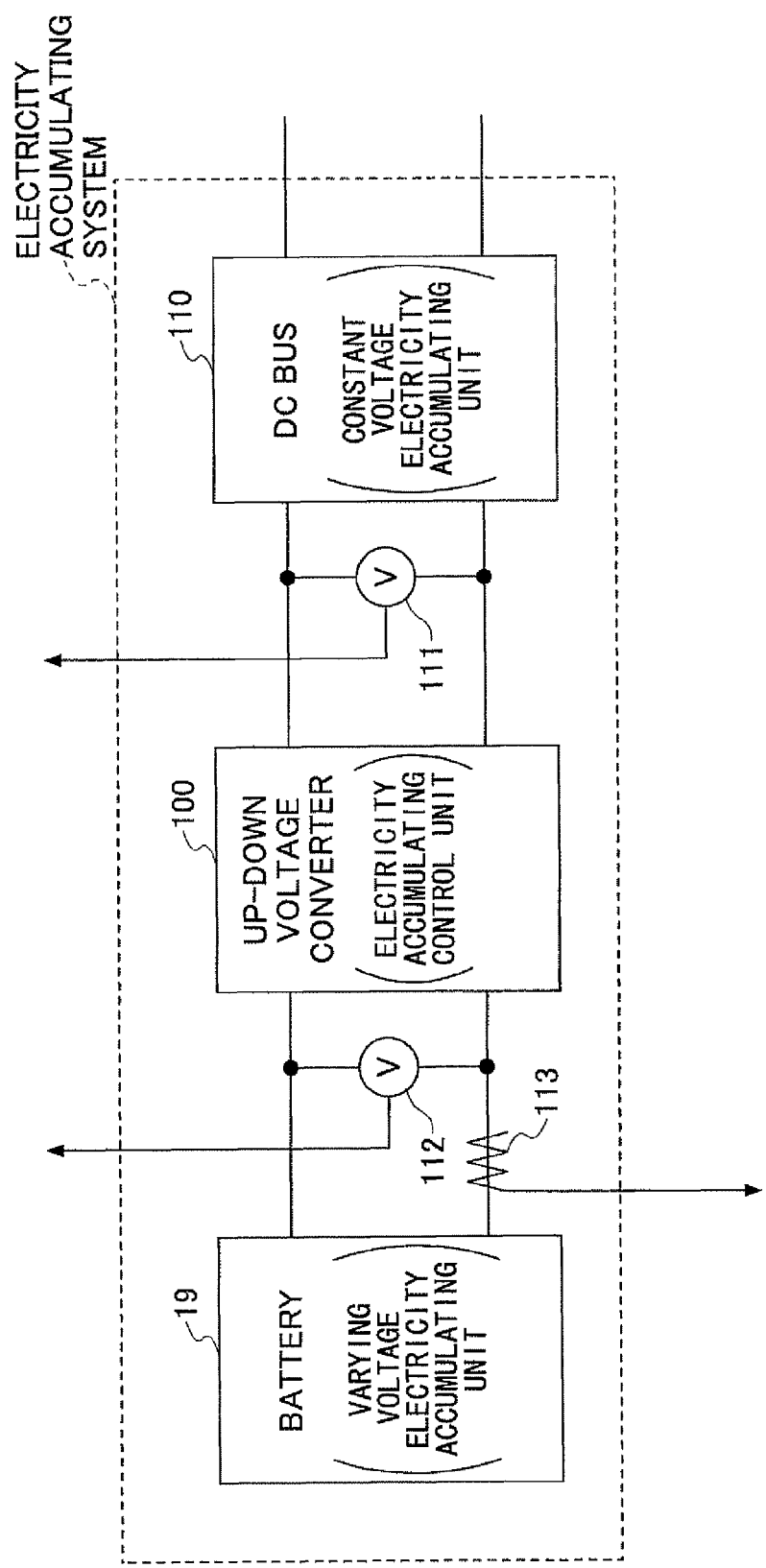
FIG. 3 is a circuit diagram of an electricity accumulating system shown in FIG. 2.

FIG. 3 is a circuit diagram of the electricity accumulating system shown in FIG. 2. The electricity accumulating system includes the DC bus 110 as a fixed voltage electricity accumulating unit, the up-down voltage converter 100 as an electricity accumulating control unit, and the battery 19 as a varying voltage electricity accumulating unit.

One side of the up-down voltage converters 100 is connected to the motor generator 12, the lifting magnet 6, and the turning motor 21 via the DC bus 110. The other side the up-down voltage converters 100 else is connected to the battery 19. The up-down voltage converter 100 performs control of switching of voltage raising and voltage lowering so that the DC bus voltage value may fall within a constant range. It is necessary to supply electric power to the motor generator 12 via the inverter 18A when the motor generator 12 performs the motor-driven (motor-assisted) operation, and it is necessary to carry out voltage raising of the DC bus voltage value. On the other hand, it is necessary to supply the generated electric power to the battery 19 via the inverter 18A when the motor generator 12 performs the power generating operation, and it is necessary to lower the voltage of the DC bus voltage value. This is the same also in magnetization (attraction) operation and demagnetization (release) operation of the lifting magnet 6, and in power operation and regeneration operation of the turning motor 21.

Moreover, the motor generator 12 is caused to perform switching of the operational status according to the loaded condition of the engine 11, and the lifting magnet 6 is caused to perform switching of magnetization (attraction) operation and demagnetization (release) operation according to the operational state, and further the turning motor 21 is caused to perform switching of the operational status according to the turning operation of the upper turning part 3. For this reason, the situation in which any one of the motor generator 12, the lifting magnet 6, and the turning motor 21 performs a motor-driven (motor-assisted) operation, a magnetization (attraction) operation, or a power operation, and any performs electric power generating operation, demagnetization (release) operation, or regeneration operation, may arise.

For this reason, the up-down voltage converter 100 performs control of switching of voltage raising and voltage lowering according to the operational status of the motor generator 12, the lifting magnet 6, and the turning motor 21, so that the DC bus voltage value may fall within a predetermined range.

The DC bus 110 is arranged between the inverters 18A, 18B, 20 and the up-down voltage converter 100. The DC bus 110 is arranged to transfer of electric power between the battery 19, the motor generator 12, the lifting magnet 6, and the turning motor 21.

The DC bus voltage detector 111 is a voltage detector for detecting the DC bus voltage value. The DC bus voltage value detected by the DC bus voltage detector 111 is input to the controller 30. The DC bus voltage value is used to perform control of switching of the voltage raising and the voltage lowering in order to make the DC bus voltage value fall within the predetermined range.

The battery voltage detector 112 is a voltage detector for detecting the voltage value of the battery 19, and the value is used in order to detect the charging state of the battery. The battery voltage value detected by the battery voltage detector 112 is input to the controller 30, and the value is used in order to perform control of switching of the voltage raising and the voltage lowering of the up-down voltage converter 100.

The battery current detector 113 is a current detector for detecting the current value of the battery 19. A battery current value is detected assuming that the electric current from the battery 19 which flows into the up-down voltage converter 100 has a positive value. The battery current value detected by the battery current detector 113 is input to the controller 30, and the value is used in order to perform control of switching of the voltage raising and the voltage lowering of the up-down voltage converter 100.

The turning motor 21 is a motor capable of operating in each of a power running mode and a regeneration mode. The turning motor 21 is an electric-motor work element provided to drive the turning device 2 of the upper turning part 3. In the case of power operation, the torque of the rotation driving force of the turning motor 21 is amplified in the reduction gear 24, and the acceleration/deceleration control is performed to rotate the upper turning part 3. When the upper turning part 3 performs inertia rotation, the shaft of the reduction gear 24 is rotated. The torque of the reduction gear 24 is transmitted to the turning motor 21, and the turning motor 21 regenerates electric power.

The turning motor 21 in this embodiment is a motor which is driven by the AC (alternating current) through a PWM (pulse width modulation) control signal from the inverter 20. For example, the turning motor 21 may be formed of a magnet embedded type IPM motor. Thereby, a large induced electromotive force can be generated, and the electric power generated by the turning motor 21 at the time of regeneration can be increased.

The resolver 22 is a sensor which detects a rotation position and a rotation angle of the rotary shaft 21A of the turning motor 21. The resolver 22 is mechanically connected to the turning motor 21, and detects a difference between a rotation position of the rotary shaft 21A before rotation of the turning motor 21 and a rotation position thereof after rotation of right-side turning or left-side turning. Thereby, the resolver 22 detects the rotation angle and the rotation direction of the rotary shaft 21A. By detecting the rotation angle of the rotary shaft 21A of the turning motor 21, the rotation angle and the rotation direction of the turning device 2 are computed. The embodiment in which the resolver 22 is provided is illustrated in FIG. 2. Alternatively, an inverter control system including no rotation sensor of the motor may be used.

The mechanical brake 23 is a brake device which generates a mechanical braking force, and this brake mechanically stops the rotary shaft 21A of the turning motor 21. The braking/canceling of the mechanical brake 23 is switched by using an electromagnetic switch. This switching is performed by the controller 30.

The turning reduction gear 24 is a reduction gear which slows down the rotational speed of the rotary shaft 21A of the turning motor 21, and the torque is mechanically transmitted to the turning device 2. In the case of power operation, the torque of the turning motor 21 can be increased and the increased torque can be transmitted to the turning device. On the other hand, in the case of regeneration operation, the rotation speed generated in the turning part can be increased and the turning motor 21 can be made to generate more rotating operation.

The turning of the turning device 2 is enabled when the braking of the mechanical brake 23 of the turning motor 21 is canceled. Thereby, the upper turning part 3 can be turned to the left or the right.

The operation device 26 is a device for manipulating operation of the turning motor 21, the lower running part 1, the boom 4, the arm 5, and the lifting magnet 6. Levers 26A and 26B, a pedal 26C, and a button switch 26D are disposed in the circumference of the operator seat in the cabin 10, and are operated by the operator of the lifting magnet type hydraulic excavator.

The operation device 26 converts the hydraulic pressure (primary side hydraulic pressure) supplied through the pilot line 25 into the hydraulic pressure (secondary side hydraulic pressure) according to the amount of manipulation of the levers 26A and 26B and the pedals 26C by the operator, and outputs the resulting hydraulic pressure. The hydraulic pressure of the secondary side output from the operation device 26 is supplied to the control valve 17 through the hydraulic line 27. The pressure sensor 29 detects the hydraulic pressure of the secondary side output from the operation device 26, and supplies the detected hydraulic pressure value to the controller 30.

The lever 26A is a lever for operating the turning motor 21 and the arm 5, and is located at the front right position of the operator seat. The lever 26B is a lever for operating the boom 4 and the lifting magnet 6, and is located at the front left position of the operator seat. The pedals 26C are a pair of pedals for operating the lower running part 1, and are disposed at the foot portions under the operator seat. The lever 26B is a lever for manipulating angle of the lifting magnet 6. The switching ON/OFF of the electromagnet of the lifting magnet 6 is operated by the button switch 26D (which will be described later).

When any of the levers 26A and 26B and the pedals 26C of the operation device 26 are operated, the control valve 17 is driven through the hydraulic line 27. Thereby, the hydraulic pressure in the hydraulic motors 1A and 1B, the boom cylinder 7, the arm cylinder 8, and the bucket cylinder 9 is controlled, and the lower running part 1, the boom 4, the arm 5, and the lifting magnet 6 are driven.

For the sake of convenience, the button switch 26D which is separate from the operation device 26 is shown in FIG. 2. The button switch 26D is a push button switch which is disposed on the top of the lever 26A, and is electrically connected to the controller 30. The button switch 26D is a switch for performing switching ON/OFF of the electromagnet of the lifting magnet 6 (switching of magnetization (attraction) and demagnetization (release)).

The button switch 26D may be arranged on the top of the lever 26B. A switch for magnetization and a switch for demagnetization may be arranged separately. When the switch for magnetization and the switch for demagnetization are separated from each other, one may be disposed on the lever 26A and the other side may be disposed on the lever 26B.

The hydraulic line 27 is a hydraulic pressure piping for supplying hydraulic pressure, required for the drive of the hydraulic motors 1A and 1B, the boom cylinder 7, the arm cylinder 8, and the bucket cylinder 9, to the control valve 17.

The pressure sensor 29 is a turning operation detector, and when a manipulation for turning the turning device 2 is input to the operation device 26, the pressure sensor 29 detects the amount of the manipulation as a change of the hydraulic pressure in the hydraulic line 28. The pressure sensor 29 outputs an electric signal indicating the hydraulic pressure in the hydraulic line 28. The amount of manipulation for turning the turning device 2, input to the operation device 26, can be detected exactly. This electric signal is input to the controller 30 and used to control drive of the turning motor 21.

In the first embodiment, the pressure sensor is used as a lever operation detector. Alternatively, a sensor that directly reads an electric signal indicating the amount of manipulation for turning the turning device 2, input to the operation device 26, may be used.

The controller 30 is a main control part which controls drive of the lifting magnet type hydraulic excavator of the first embodiment. The controller 30 includes a processor unit including a CPU (central processor unit) and an internal memory, and performs the drive control when the CPU executes a program for the drive control stored in the internal memory.

The controller 30 converts a signal received from the pressure sensor 29 (which signal indicates the amount of manipulation for turning the turning device 2 input to the operation device 26) into a speed command, and controls the drive of the turning motor 21 by outputting the speed command.

The controller 30 performs the operation control of the motor generator 12 (switching of the motor-driven operation or the generation operation), the drive control of the lifting magnet 6 (switching of the magnetization (attraction) operation or the demagnetization (release) operation), and the operation control of the turning motor 21 (switching of the power operation or the regeneration operation). The controller 30 functions as an up-down voltage control part which performs the drive control of the up-down voltage converter 100, and performs the charging/discharging control of the battery 19.

The control of switching of the voltage raising and the voltage lowering of the up-down voltage converter 100 is performed based on the DC bus voltage value detected by the DC bus voltage detector 111, the battery voltage value detected by the battery voltage detector 112, and the battery current value detected by the battery current detector 113.

Figure 4:
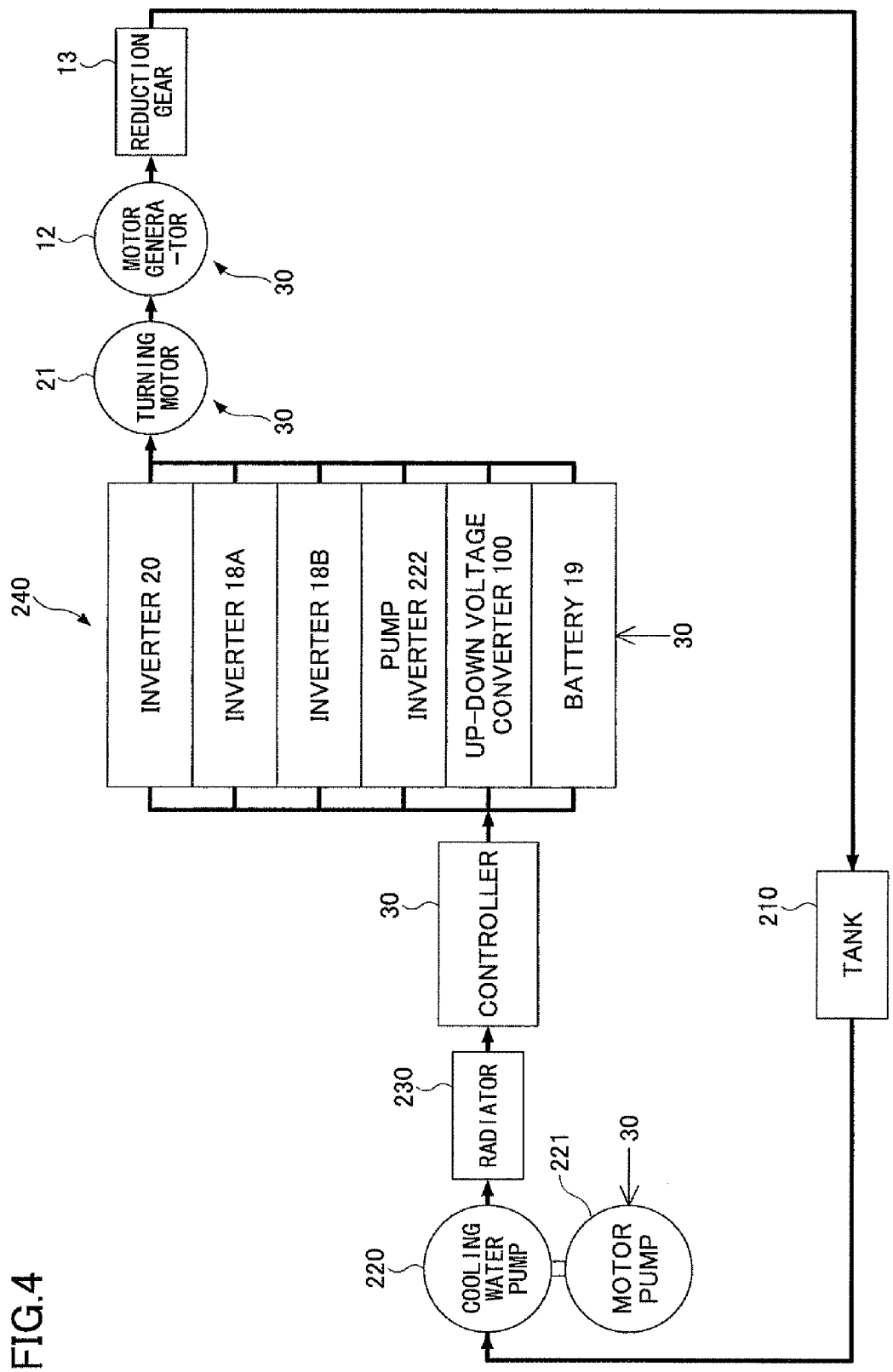
FIG. 4 is a diagram showing a cooling path of a drive control system, including a motor generator, a reduction gear and a turning motor, in the lifting magnet type hydraulic excavator of the first embodiment.

FIG. 4 is a diagram showing a cooling path of cooling water which cools the drive control system including the motor generator 12, the reduction gear 13, and the turning motor 21. In FIG. 4, the sequence of each element by which the cooling water flows into the element is indicated, and the arrow indicates the direction in which the cooling water flows.

The lifting magnet type hydraulic excavator of this embodiment includes a cooling system for cooling the motor generator 12, the reduction gear 13, and the turning motor 21, which is separated from the cooling system of the engine 11.

As shown in FIG. 4, in the cooling system, the cooling water in the tank 210 is fed by the cooling water pump 220, the water is cooled by the radiator 230, and the water is circulated in order of the controller 30, the power supply system 240, the turning motor 21, the motor generator 12, and the reduction gear 13. The water is returned back to the tank 210.

The cooling water pump 220 is driven by the pump motor 221 which is controlled by the controller 30. The power supply system 240 includes the inverters 18A, 18B, 20, the pump inverter 222, the up-down voltage converter 100, and the battery 19. The lifting magnet 6 is of air cooling type, and it is not contained in this cooling system. Only the inverter 18B which controls the drive of the lifting magnet 6 is contained in the cooling system.

Figure 5:
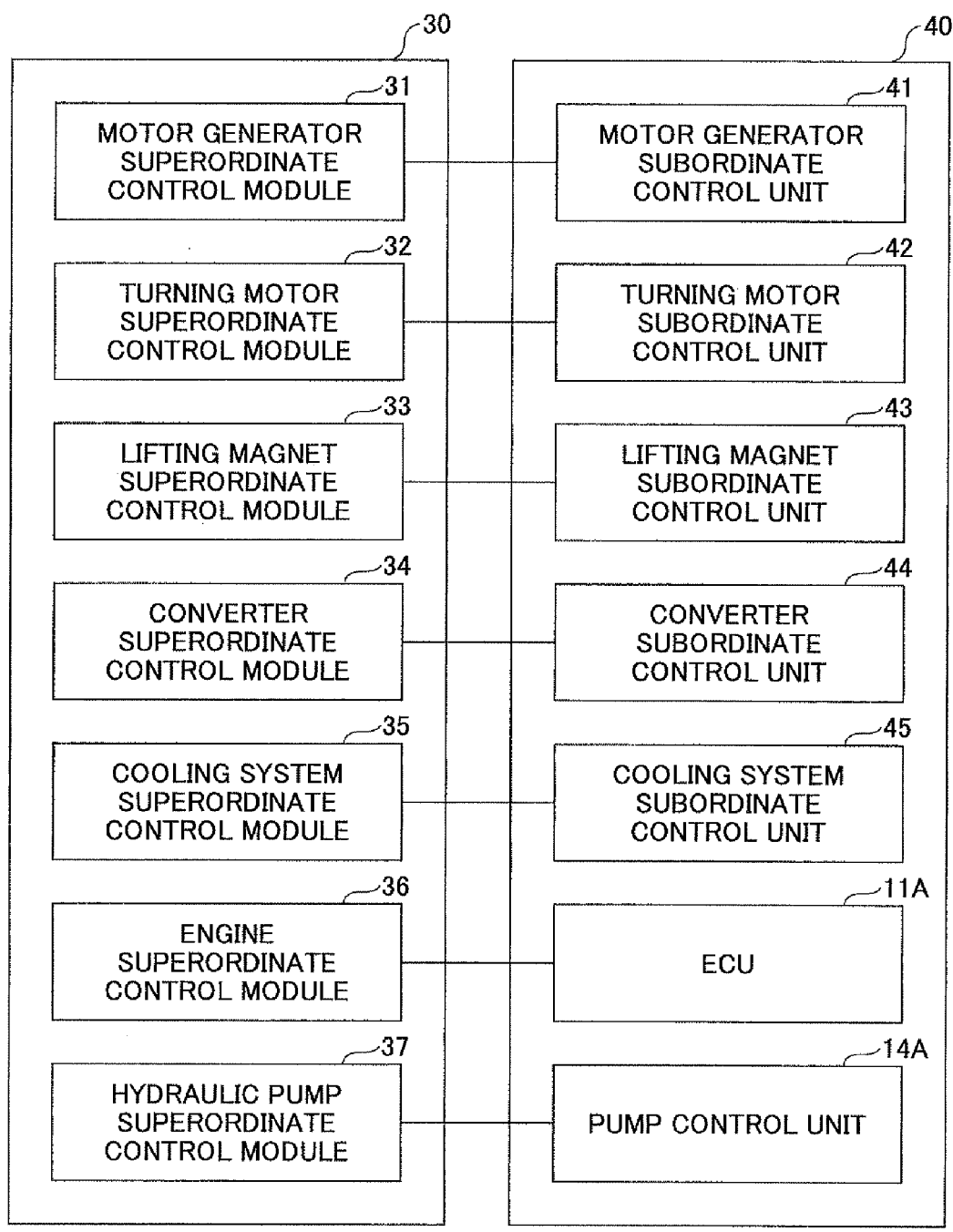
FIG. 5 is a block diagram showing the composition of a control system of the lifting magnet type hydraulic excavator of the first embodiment.

FIG. 5 is a block diagram showing the composition of a control system of the lifting magnet type hydraulic excavator. The control system shown in FIG. 5 includes the controller 30 as a superordinate control unit, and a subordinate control unit 40.

The controller 30 is a superordinate control unit, and includes a motor generator superordinate control module 31, a turning motor superordinate control module 32, a lifting magnet superordinate control module 33, a converter superordinate control module 34, a cooling system superordinate control module 35, an engine superordinate control module 36, and a hydraulic pump superordinate control module 37.

The subordinate control unit 40 includes a motor generator subordinate control unit 41, a turning motor subordinate control unit 42, a lifting magnet subordinate control unit 43, a converter subordinate control unit 44, a cooling system subordinate control unit 45, an ECU 11A, and a pump control part 14A.

The motor generator subordinate control unit 41 is a rotary machine subordinate control unit contained in the inverter 18A. The motor generator subordinate control unit 41 controls drive of the motor generator 12, which is one of the rotary machines, based on the control command received from the motor generator superordinate control module 31 which is a rotary machine superordinate control module.

The turning motor subordinate control unit 42 is a rotary machine subordinate control unit contained in the inverter 20. The turning motor subordinate control unit 42 controls drive of the motor generator 12, which is one of the rotary machines, based on the control command received from the turning motor superordinate control module 32 which is a rotary machine superordinate control module.

The lifting magnet subordinate control unit 43 is a lifting magnet subordinate control unit contained in the inverter 18B. The lifting magnet subordinate control unit 43 controls drive of the lifting magnet 6 based on the control command received from the lifting magnet superordinate control module 33 which is a lifting magnet superordinate control module.

The converter subordinate control unit 44 is an electricity accumulating system subordinate control unit contained in the up-down voltage converter 100. The converter subordinate control unit 44 controls drive of the up-down voltage converter 100 based on the control command received from the converter superordinate control module 34 which is an electricity accumulating system superordinate control module.

The converter subordinate control unit 44 control of switching of the voltage raising and the voltage lowering of the up-down voltage converter 100, based on the charging state of the battery 19, the operational status of the motor generator 12 (the motor-driven (motor-assisted) operation or the generating operation), the operational status of the lifting magnet 6 (magnetization (attraction) operation or demagnetization (release) operation), and the operational status of the turning motor 21 (the power operation or the regeneration operation), and thereby performing charging/discharging control of the battery 19.

The cooling system subordinate control unit 45 is a cooling pump subordinate control unit contained in the pump inverter 222. The cooling system subordinate control unit 45 controls drive of the pump motor 221 based on the control command received from the cooling system superordinate control module 35 which is a cooling pump superordinate control module.

The ECU 11A is a motor subordinate control unit which controls drive (operation control) of the engine 11 based on the control command received from the engine superordinate control module 36 which is an engine superordinate control module.

The pump control part 14A is a hydraulic pump output subordinate control unit which controls the tilting angle of the hydraulic pump 14 based on the control command received from the hydraulic pump superordinate control module 37 which is a hydraulic pump superordinate control module.

Each module (31-37) contained in the controller 30 as a superordinate control unit transmits a control command to a corresponding subordinate control unit (41-45, 11A, and 14A). Each subordinate control unit (41-45, 11A, and 14A) controls a corresponding controlled object based on a received control command. Specifically, the drive control of each controlled object is performed as follows.

"Drive Control by each Module of Superordinate Control Unit and Subordinate Control Unit"

The motor generator superordinate control module 31 transmits a control command to the motor generator subordinate control unit 41. Based on this control command, the motor generator subordinate control unit 41 contained in the inverter 18A drives the inverter 18A. Thereby, the drive control of the motor generator 12 is performed by the motor generator subordinate control unit 41.

The turning motor superordinate control module 32 transmits a control command to the turning motor subordinate control unit 42. Based on this control command, the turning motor subordinate control unit 42 contained in the inverter 20 drives the inverter 20. Thereby, the drive control of the turning motor 21 is performed by the turning motor subordinate control unit 42.

The lifting magnet superordinate control module 33 transmits a control command to the lifting magnet subordinate control unit 43. Based on this control command, the lifting magnet subordinate control unit 43 contained in the inverter 18B drives the inverter 18B. Thereby, the drive control of the lifting magnet 6 (switching of magnetization (attraction) operation or demagnetization (release) operation) is performed by the lifting magnet subordinate control unit 43.

The converter superordinate control module 34 transmits a control command to the converter subordinate control unit 44. Based on this control command, the drive control (up-down voltage control) of the up-down voltage converter 100 is performed by the converter subordinate control unit 44.

The cooling system superordinate control module 35 transmits a control command to the cooling system subordinate control unit 45. Based on this control command, the cooling system subordinate control unit 45 contained in the pump inverter 222 drives the pump inverter 222. Thereby, the drive control of the pump motor 221 is performed by the cooling system subordinate control unit 45.

The engine superordinate control module 36 transmits a control command to the ECU 11A. Based on this control command, the drive control of the engine 11 is performed by the ECU 11A.

The hydraulic pump superordinate control module 37 transmits a control command to the pump control part 14A. Based on this control command, the drive control of the hydraulic pump (power control by control of the tilting angle) is performed by the pump control part 14A.

The motor generator superordinate control module 31, the turning motor superordinate control module 32, the lifting magnet superordinate control module 33, the converter superordinate control module 34, the cooling system superordinate control module 35, the engine superordinate control module 36, and the hydraulic pump superordinate control module 37 exchanges the information indicating energy distribution.

In the lifting magnet type hydraulic excavator of this embodiment, a subordinate control unit monitors an error in a superordinate control unit. Specifically, the error monitoring process is performed as described below.

"Error Monitoring Process by Subordinate Control Unit"

Figure 6:
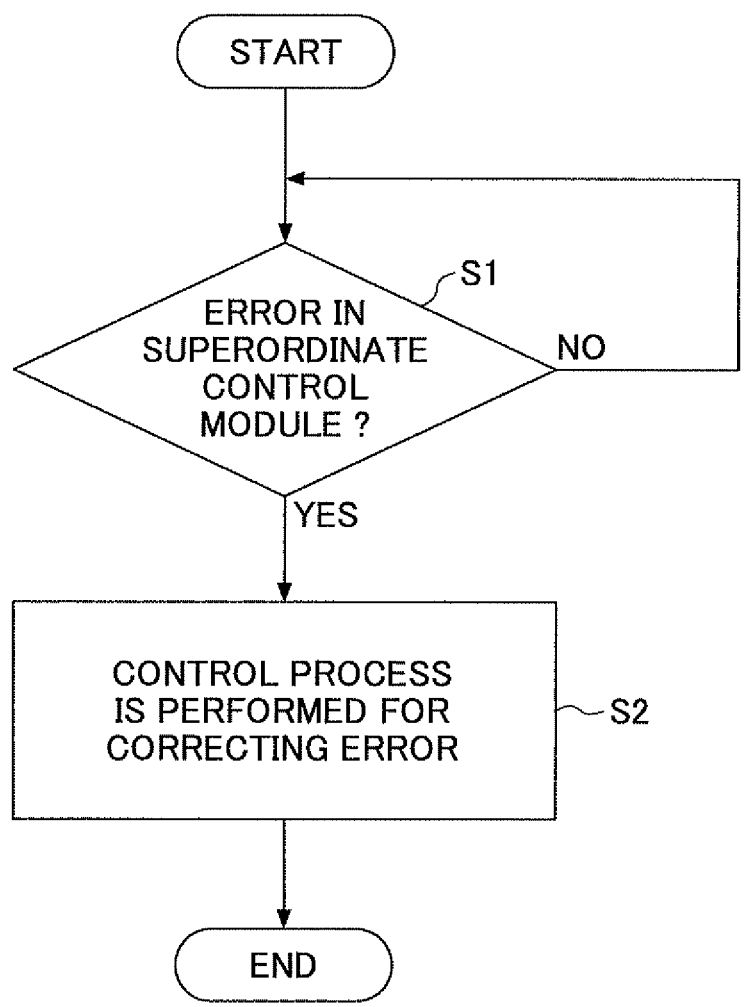
FIG. 6 is a diagram for explaining an error monitoring process of the superordinate control unit performed by the subordinate control unit of the lifting magnet type hydraulic excavator of the first embodiment.

FIG. 6 is a diagram for explaining the error monitoring process of the superordinate control unit performed by the subordinate control unit. This process is performed by each of the motor generator subordinate control unit 41, the turning motor subordinate control unit 42, the lifting magnet subordinate control unit 43, the converter subordinate control unit 44, the cooling system subordinate control unit 45, the ECU 11A, and the pump control part 14A, which are included in the subordinate control unit 40. To avoid duplicate description, the monitoring object will be referred to as "superordinate control module", and the monitoring subject will be referred to as "subordinate control unit".

When operation of the lifting magnet type hydraulic excavator is started, the subordinate control unit starts the monitoring process of the superordinate control module (start).

The subordinate control unit determines whether an error has occurred in the superordinate control module (step S1). The procedure in step S1 is repeatedly performed until an error in the superordinate control module is detected. In the error detection process, a predetermined count value N (the initial value: for example, 0) is periodically incremented (addition: for example, +1). And the subordinate control unit monitors the service clock in the superordinate control module generated by the increment. When the time for which the service clock remains unchanged exceeds a predetermined time, it is determined that an error has occurred in the superordinate control module.

When an error in the superordinate control module is detected, the subordinate control unit performs an error-corrective control process (step S2). In this control process, when an error arises in the superordinate control module and a control command is not received from the superordinate control module, the subordinate control unit controls drive of the corresponding controlled object specifically.

When the procedure of step S2 is completed, the subordinate control unit terminates the error monitoring process (end). After the error monitoring process is terminated, the subordinate control unit continues to control the drive of the corresponding controlled object.

Specifically, the error monitoring process is performed by each subordinate control unit as follows.

"Error-Corrective Control Process by each Subordinate Control Unit"

The motor generator subordinate control unit 41 stops the motor generator 12 when a period for which the service clock is not received from the motor generator superordinate control module 31 exceeds a predetermined time. When an error arises in the motor generator superordinate control module 31, the amount of assist torque required for the motor generator 12 or the surplus of the output of the engine 11 cannot be detected, and the switching of the motor-driven operation or the power generating operation cannot be appropriately performed. Hence, in this case, the motor generator 12 is stopped.

The turning motor subordinate control unit 42 stops the turning motor 21 when a period for which the service clock is not received from the turning motor superordinate control module 32 exceeds a predetermined time. When an error arises in the turning motor superordinate control module 32, neither the torque required at the time of turning acceleration nor the torque required at the time of turning deceleration can be detected exactly, and the switching of the power operation or the regeneration operation cannot be appropriately performed. Hence, in this case, the turning motor 21 is stopped.

The lifting magnet subordinate control unit 43 holds the attraction state of the lifting magnet 6 when a period for which the service clock is not received from the lifting magnet superordinate control module 33 exceeds a predetermined time but the lifting magnet 6 is in the attraction state in such a case. Even when an error arises in the lifting magnet superordinate control module 33, if a metallic part is being attracted by the lifting magnet 6 in such a case, the attraction state of the lifting magnet 6 is held without canceling the attraction state immediately. In this case, if the drive control is continuously held according to the manipulation of the operator, the operability of the hybrid construction machine can be raised.

On the other hand, the lifting magnet subordinate control unit 43 inhibits the attraction operation of the lifting magnet 6 when a period for which the service clock is not received from the lifting magnet superordinate control module 33 exceeds the predetermined time and the lifting magnet 6 is not in the attraction operation. In this case, when an error arises in lifting magnet superordinate control module 33 and the lifting magnet 6 is not in the attraction operation, if the attraction operation of the lifting magnet 6 is inhibited, the operability of the hybrid construction machine can be raised.

When the period for which the service clock is not received from the converter superordinate control module 34 exceeds a predetermined time, the converter subordinate control unit 44 allows the up-down voltage control (charging/discharging control) of the up-down voltage converter 100 only for a predetermined time, and stops the up-down voltage control of the up-down voltage converter 100 after the end of the predetermined time.

When an error arises in the converter superordinate control module 34, neither the value of the maximum input/output of the battery 19 nor the charging rate of the battery 19 can be detected exactly. In order to perform the charging/discharging of the storage battery accompanied with the attraction/cancelling of the lifting magnet 6, and the power operation and the regeneration operation of the turning motor 21, the up-down voltage control is stopped after the predetermined time has elapsed.

The cooling system subordinate control unit 45 continues to perform the drive of the pump motor 221 when a period for which the service clock is not received from the cooling system superordinate control module 35 exceeds a predetermined time. When an error arises in the cooling system superordinate control module 35, the cooling water temperature, the hydraulic pressure, and the residual quantity cannot be detected exactly. However, if the pump motor 221 is stopped immediately, the temperature of any of the elements (230, 30, 240, 21, 12, or 13) contained in the cooling system may rise. For this reason, even if an error arises in the cooling system superordinate control module 35, the drive of the pump motor 221 is continued.

The ECU 11A continues the operation of the engine 11 with the no-load output when a period for which the service clock is not received from the engine superordinate control module 36 exceeds a predetermined time. In this case, the rotation speed of the engine 11 may be changed to a rotation speed for an error-corrective process. When an error arises in the engine superordinate control module 36, the output required for the engine 11 cannot be detected exactly. However, the operation of the engine 11 is continued in order to drive the hydraulic pump 14 and secure the drive of the hydraulic pressure work element.

The pump control part 14A reduces the tilting angle of the hydraulic pump 14 to a predetermined angle, when a period for which the service clock is not received from the hydraulic pump superordinate control module 37 exceeds a predetermined time. When an error arises in the hydraulic pump superordinate control module 37, the output required for the hydraulic pump 14 cannot be exactly detected. Hence, the output of the hydraulic pump 14 is reduced to some extent and the operation is continued in order to secure the drive of the hydraulic pressure work element.

In the hybrid construction machine according to the related art, when an error arises in the superordinate control unit, any operation cannot have been performed. However, according to the hybrid construction machine of this embodiment, even if an error arises in the superordinate control unit, an error-corrective control process is performed by each of the subordinate control units (41-45, 11A, and 14A) as mentioned above. For this reason, even when an error arises in the superordinate control module, stopping or continuation of the drive can be performed according to the location where the error has occurred. Thereby, it is possible to provide a hybrid construction machine which is able to improve the working efficiency.

In the above-mentioned embodiment, the engine superordinate control module 36 and the hydraulic pump superordinate control module 37 transmit a control command to the ECU 11A and the pump control part 14A which are subordinate control units. The ECU 11A and the pump control part 14A are the subordinate control units which control the drive of the engine 11 and the drive of the hydraulic pump 14.

However, it is not necessary to divide the control system of the engine 11 and the hydraulic pump 14 into a superordinate control unit and a subordinate control unit. For example, an engine control module may be provided instead of the engine superordinate control module 36, the ECU 11A may control the drive of the engine 11, and the engine control module may be arranged to exchange the information of the energy distribution between the respective superordinate control modules contained in the controller 30.

Similarly, it is not necessary to divide each of the hydraulic pump superordinate control module 37 and the pump control part 14A into a superordinate control unit and a subordinate control unit.

For example, a hydraulic pump control module may be provided instead of the hydraulic pump superordinate control module 37. The pump control part 14A may perform drive control of hydraulic pump 14, and between each module for superordinate control contained in the controller 30, a hydraulic pump control module may be constituted so that the information of the energy distribution may be exchanged.

Although the subordinate control unit explained the form which ends the error monitoring process at step S2 in this embodiment, it may be made to carry out the return of the procedure to step S1, continuing the drive control of a controlled object after step S2 is completed. In this case, when the error in the superordinate control module is eliminated, it may be make it return to the control state at the time of usual the subordinate control unit controls the drive based on the control command received from the superordinate control module.

In the above-described embodiment, the hydraulic excavator is provided with the lifting magnet 6 as an example of the hybrid construction machine. Alternatively, the hybrid construction machine may be provided with a bucket instead of the lifting magnet 6. In such a case, the error-corrective control process for the lifting magnet 6 becomes unnecessary.

Next, a hybrid construction machine of a second embodiment of the present disclosure will be described. The hybrid construction machine of the second embodiment differs from the hybrid construction machine of the first embodiment in the method of detecting an error in a superordinate control module.

The hybrid construction machine of the second embodiment differs from the hybrid construction machine of the first embodiment in that the subordinate control unit does not monitor the service clock received from the superordinate control module, but detects an error in the superordinate control module based on the value of the control command received from the superordinate control module.

Specifically, in order to determine whether the value of the control command received from each of the motor generator superordinate control module 31, the turning motor superordinate control module 32, the lifting magnet superordinate control module 33, the cooling system superordinate control module 35, the engine superordinate control module 36, and the hydraulic pump superordinate control module 37 is an error, each of the motor generator subordinate control unit 41, the turning motor subordinate control unit 42, the lifting magnet subordinate control unit 43, the converter subordinate control unit 44, the cooling system subordinate control unit 45, the ECU 11A, and the pump control part 14A stores a first threshold as a lower limit and a second threshold as an upper limit. When the value of a received control command does not fall within a range between the first threshold and the second threshold, it is determined that an error has occurred in a corresponding one of the superordinate control modules.

The error-corrective control process of the second embodiment after the error is detected is the same as that of the hybrid construction machine of the first embodiment, and a description thereof will be omitted.

Thus, according to the hybrid construction machine of the second embodiment, the value of the control command received from the superordinate control module is monitored by the subordinate control unit, and when an error in the superordinate control unit is detected, the error-corrective control process is performed by each subordinate control unit (41-45, 11A, and 14A). For this reason, even when an error arises in the superordinate control module, the stopping or continuing of the drive can be performed according to the location where an error has occurred, and the working efficiency of the hybrid construction machine can be improved.

Figure 7:
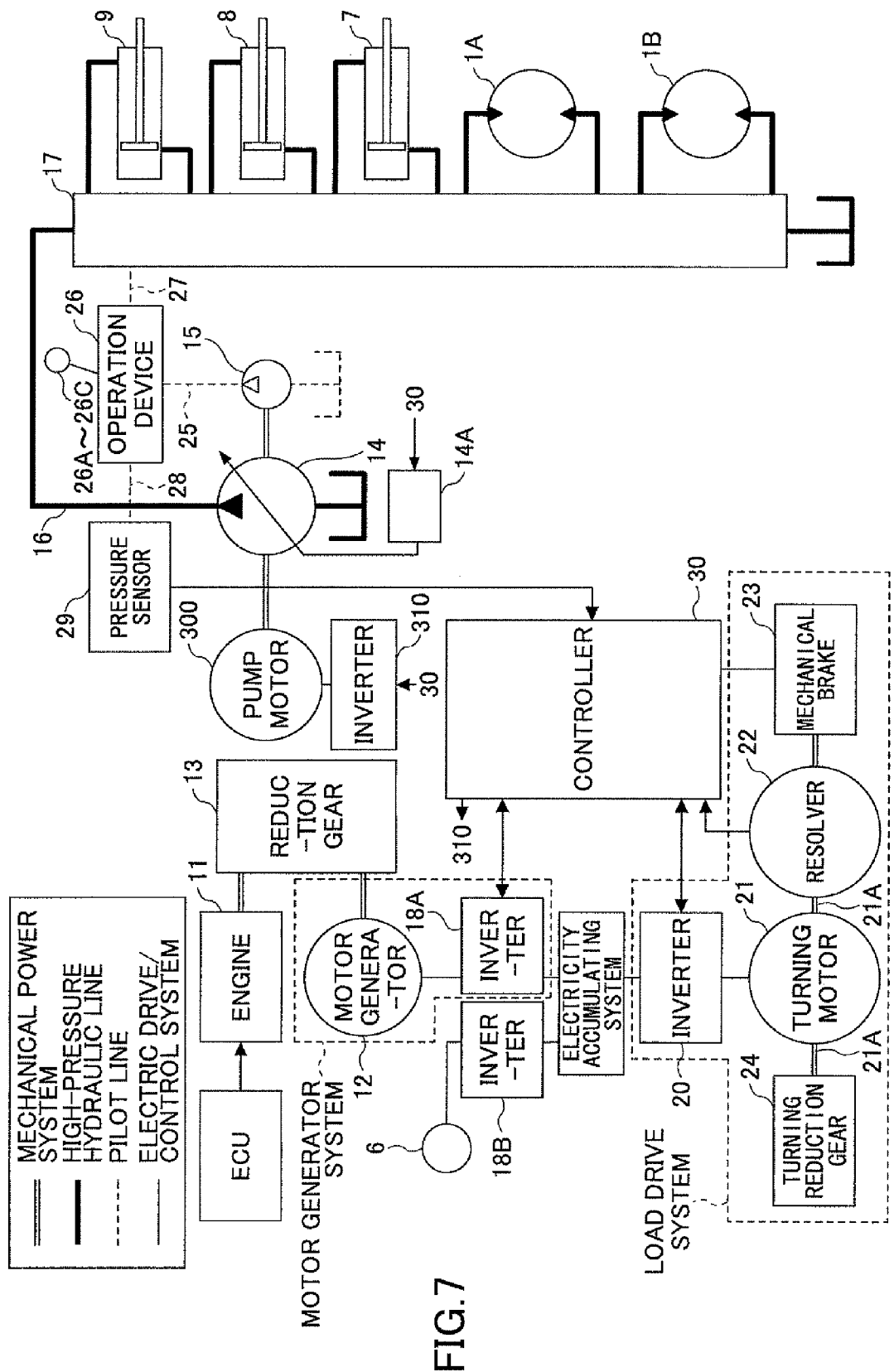
FIG. 7 is a block diagram showing the composition of a lifting magnet type hydraulic excavator which is a hybrid construction machine of a third embodiment of the present disclosure.

Next, a hybrid construction machine of a third embodiment of the present disclosure will be described. FIG. 7 is a block diagram showing the composition of the lifting magnet type hydraulic excavator which is the hybrid construction machine of the third embodiment. In the lifting magnet type hydraulic excavator of this embodiment, the drive of the main pump 14 is performed by the pump motor 300, and the driving motor generator 12 perform only recovery of electric power (electric power generating operation) by the drive of the engine 11, which differs from the hybrid construction machine of the first embodiment. That is, the motor generator 12 in this embodiment is provided only with the function as a dynamo to perform only the electric power generating operation by driving the engine 11. Because any other composition of this embodiment is the same as that of the first embodiment, the elements which are the same as corresponding elements of the first embodiment are designated by the same reference numerals, and a description thereof is omitted.

The pump motor 300 is constituted to perform only power operation for driving the main pump 14, and connected to the DC bus 110 via the inverter 310. The pump motor 300 is constituted so that the pump motor 300 is driven by the controller 30. If any one of the levers 26A-26C is operated, electric power from the DC bus 110 is supplied to the pump motor 300 via the inverter 310 to perform the power operation so that the pump 14 is driven to discharge the pressure oil.

In the lifting magnet type hydraulic excavator of this embodiment, the situation in which the electric power from the DC bus 110 is supplied to any one of the motor generator 12, the pump motor 300, and the turning motor 21 may arise. The situation in which either of the motor generator 12 and the turning motor 21 supplies the electric power to the DC bus 110 may arise.

In this embodiment, the up-down voltage converter 100 performs control of switching of voltage raising and voltage lowering so that the DC bus voltage value may fall within a predetermined range according to the operational status of the motor generator 12, the pump motor 300, and the turning motor 21.

The DC bus 110 is disposed between the inverters 18A, 310, 20 and the up-down voltage converter 100, and exchanges electric power between the battery 19, the pump motor 300, and the turning motor 21.

The error monitoring process of the superordinate control module by the subordinate control unit in the hybrid construction machine of the third embodiment is performed in the same manner as the hybrid construction machine of the first embodiment.

Namely, the motor generator subordinate control unit 41, the turning motor subordinate control unit 42, the lifting magnet subordinate control unit 43, the converter subordinate control unit 44, the cooling system subordinate control unit 45, the ECU 11A, and the pump control part 14A respectively monitors the motor generator superordinate control module 31, the turning motor superordinate control module 32, the lifting magnet superordinate control module 33, the cooling system superordinate control module 35, the engine superordinate control module 36, and the hydraulic pump superordinate control module 37. When a period of time for which the service clock cannot be detected exceeds a predetermined time, it is determined that an error has occurred in the superordinate control module.

As mentioned above, the hybrid construction machine of the third embodiment is arranged like the hybrid construction machine of the first embodiment so that a superordinate control module is monitored by a subordinate control unit, and when an error in the superordinate control unit is detected, the control process at the time of the error is performed by each subordinate control unit (41-45, 11A, and 14A). Hence, even when an error arises in a superordinate control module, stopping or continuation of the drive can be performed according to the portion where the error arises, and it is possible to provide the hybrid construction machine which improves the working efficiency.

In the foregoing embodiment, the error monitoring of the drive control system of the hydraulic pump 14 is performed by using the pump control part 14A which monitors an error in the hydraulic pump superordinate control module 37. An alternative embodiment may be arranged so that a subordinate control unit is included in the inverter 310 and a superordinate control module for controlling the drive of the pump motor 300 is included in the controller 30 as the superordinate control unit. In the alternative embodiment, in addition to the error monitoring of the hydraulic pump superordinate control module 37 by the pump control part 14A, the subordinate control unit in the inverter 310 monitors the superordinate control module in the controller 30 which controls the drive of the pump motor 300. In this case, when an error arises in the superordinate control module for controlling the drive of the pump motor 300, the operation of the pump motor 300 may be continued by the subordinate control unit in the inverter 310. By this control process, the operation of the pump motor 300 is continued in a state where the output of the hydraulic pump 14 is reduced to some extent while the pump motor 300 is being driven, and the drive of the hydraulic pressure work element can be secured.

Next, a lifting magnet type hydraulic excavator will be described as a hybrid construction machine of a fourth embodiment of the present disclosure. The composition of the lifting magnet type hydraulic excavator of the fourth embodiment is essentially the same as that of the lifting magnet type hydraulic excavator of the first embodiment shown in FIGS. 1 and 2, and a description thereof is omitted.

The lifting magnet type hydraulic excavator of this embodiment includes a servo control unit for controlling operation of the motor generator 12 and the turning motor 21 as the electric load and for controlling charging/discharging of the battery 19. In this embodiment, the temperature is equalized by agitating the air in the servo control unit, thereby improving the cooling efficiency in the servo control unit.

The CPU which is corresponding to the superordinate control module in the first embodiment is contained in the servo control unit. The details of the servo control unit will be described later.

Figure 8:
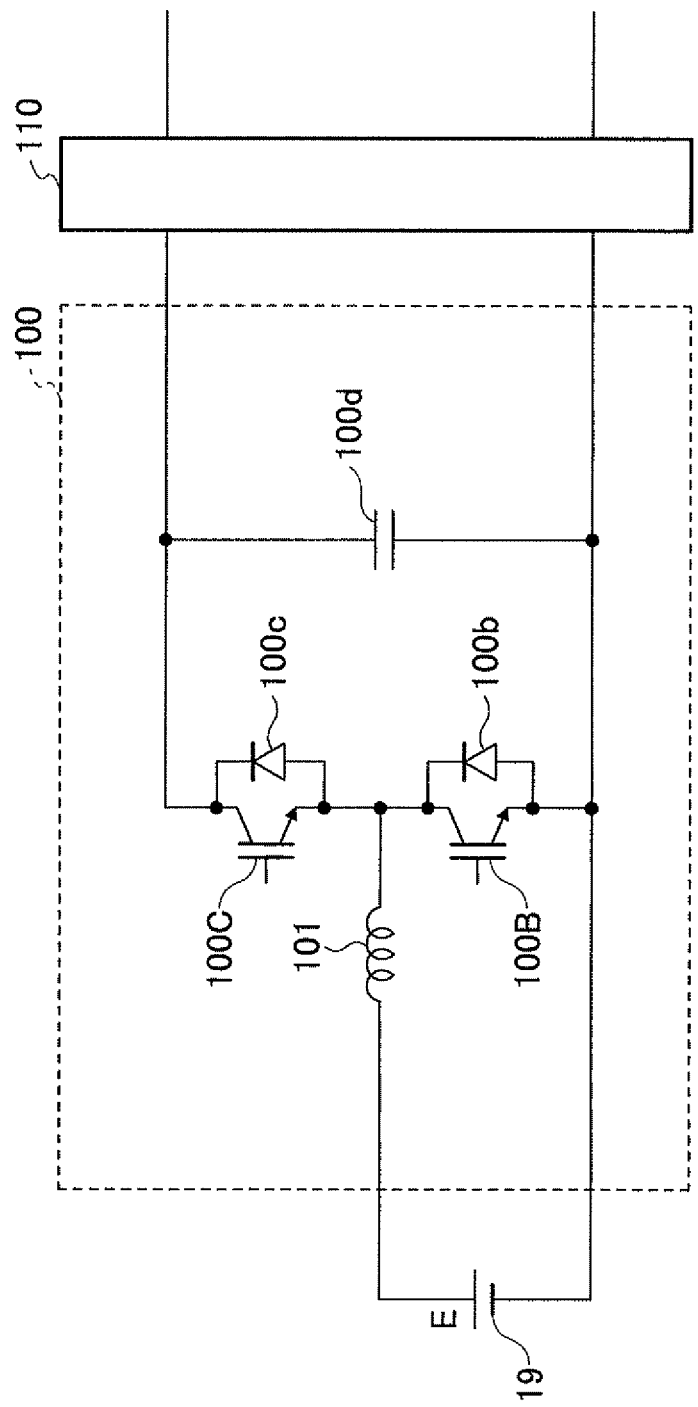
FIG. 8 is a circuit diagram of an electricity accumulating system including an up-down voltage converter in a hybrid construction machine of a fourth embodiment of the present disclosure.

The up-down voltage converter 100 contained in the electricity accumulating system of this embodiment will be described. FIG. 8 is a circuit diagram of the electricity accumulating system including the up-down voltage converter 100.

The up-down voltage converter 100 includes a reactor 101, transistors 100B and 100C, and a smoothing capacitor 100d. Each of the transistors 100B and 100C is formed by an IGBT (insulated gate bipolar transistor), and the transistors 100B and 100C are connected in series to each other. Specifically, the collector of transistor 100B and the emitter of transistor 100C are connected to each other. The emitter of transistor 100B is connected to the negative side terminal of battery 19, and to the negative side wiring of DC bus 110. The collector of transistor 100C is connected to the positive side wiring of DC bus 110. One end of the reactor 101 is connected to the collector of transistor 100B and the emitter of transistor 100C, and the other end thereof is connected to the positive side terminal of battery 19. The PWM voltage from the controller 30 is supplied to the gates of the transistors 100B and 100C. The diode 100b, which is a rectifier cell, is connected between the collector and the emitter of transistor 100B in the opposite direction. Similarly, the diode 100c is connected between the collector and the emitter of transistor 100C in the opposite direction. The capacitor 100d is connected between the collector of transistor 100C and the emitter of transistor 100B and provided for smoothing the output voltage from the up-down voltage converter 100.

In the up-down voltage converter 100 having the above-described composition, when supplying the direct current power from the battery 19 to the DC bus 110, the PWM voltage is supplied to the gate of the transistor 100B. Induced electromotive force is generated in the reactor 101 accompanied with the switching ON/OFF of the transistor 100B. This induced electromotive force is transmitted via the diode 100c and the voltage is smoothed by the capacitor 100d.

When supplying the direct current power to the battery 19 from the DC bus 110, the PWM voltage is supplied to the gate of the transistor 100C. The electric current output from the transistor 100C is smoothed by the reactor 101.

Because the transistors 100B and 100C control large electric power, the transistors 100B and 100C have a very large heating value. The reactor 101 also has a large heating value. Therefore, it is necessary to cool the transistors 100B and 100C and the reactor 101.

Similar to the up-down voltage converter 100, the inverter circuits 18A, 18B, and 20 include transistors which controls large electric power, and it is necessary to cool these circuits. In this embodiment, the coolant recycling system is provided for cooling the up-down voltage converter 100 and the inverters 18A, 18B, and 20.

Next, the servo control unit 60 will be described. FIG. 9 is a perspective view of the servo control unit 60. The servo control unit 60 is a device which controls the motor generator 12, the turning motor 21, and the battery 19. The servo control unit 60 has a configuration of a rectangular parallelepiped and includes a control box 600 in which the controller 30 is accommodated, and driver units 62-66. The driver units 62-66 include an up-down voltage converter unit 62 and inverter units 63-66.

The up-down voltage converter unit 62 includes the up-down voltage converter 100 accommodated therein. The inverter units 63-66 include the inverters 18A, 20A, and 20B and other inverters accommodated therein. The up-down voltage converter unit 62 and the inverter units 63-66 have an airtight structure for water-proofing and dust-proofing purposes.

Each of the driver units 62-66 has a metal container having a configuration of a rectangular parallelepiped which is elongated in the depth direction. These driver units 62-66 are installed side by side in the transverse direction (first direction) in a plate-like base 67 which is made of a metal and has a top surface opened. The driver units 62-66 are fixed to the plate-like base 67 with bolts respectively. A control unit bottom plate 61b as an upper lid is arranged on the driver units 62-66 to cover the top surfaces of the driver units 62-66. The control unit 600 is disposed on the control unit bottom plate 61b. The heat sink 68 for air cooling is attached to the top surface of the control unit 600. The top surfaces of the driver units 62-66 are sealed by the control unit bottom plate 61b.

The up-down voltage converter unit 62 accommodates electric circuits and modules for constituting the up-down voltage converter 100, and includes an electric input terminal and an output terminal. For example, the battery 19 for accumulation of electricity is connected to the output terminal of the up-down voltage converter unit 62. In this case, the up-down voltage converter unit 62 controls the charging/discharging of the battery 19.

Each of the inverter units 63-66 accommodates electric circuits and modules for constituting the inverter, and includes an electric input terminal and an output terminal. For example, an alternating current motor constituted by an IPM motor in which a magnet is embedded in the rotor is connected to the output terminal of each of the inverter units 63-66. The inverter units 63-66 convert the direct current into the alternating current and drive the alternating current motor. The alternating current motor is driven by the PWM control signal output from the inverter units 63-66.

The control unit 600 accommodates the controller which controls the driver units 62-66. The controller includes a processor unit, having a CPU and an internal memory, and an electronic circuit. The drive control program stored in the internal memory is read and executed by the CPU to perform the drive control.

Cooling pipes 608 are contained in the control unit 600. Similarly, cooling pipes 62a are contained in the up-down voltage converter unit 62, and cooling pipes 63a-66a are contained in the inverter units 63-66, respectively.

Figure 10A:
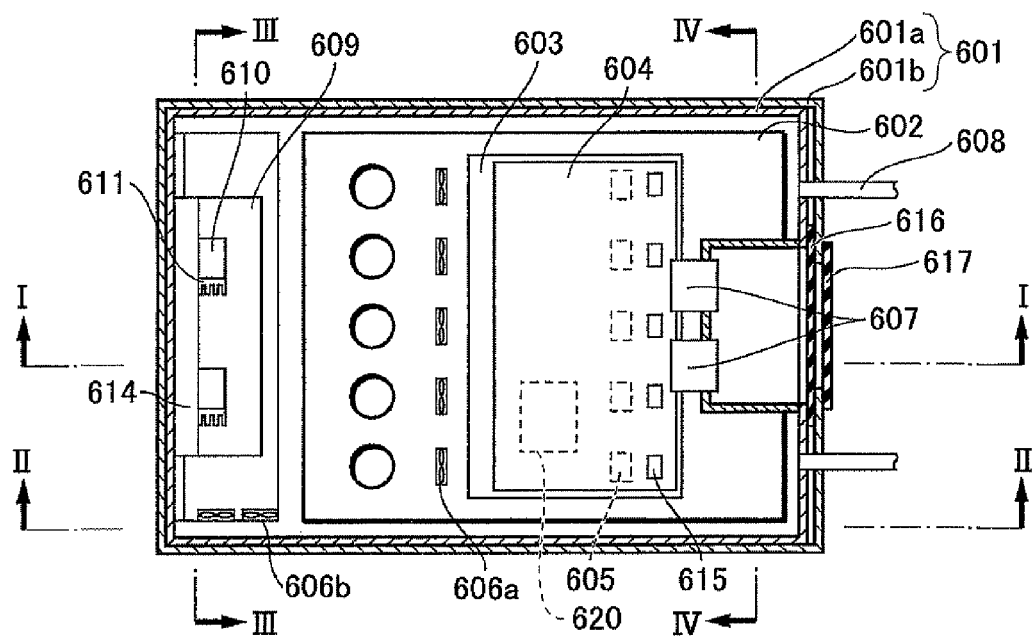
FIG. 10A is a horizontal cross-sectional view of a control unit.
Figure 10B:
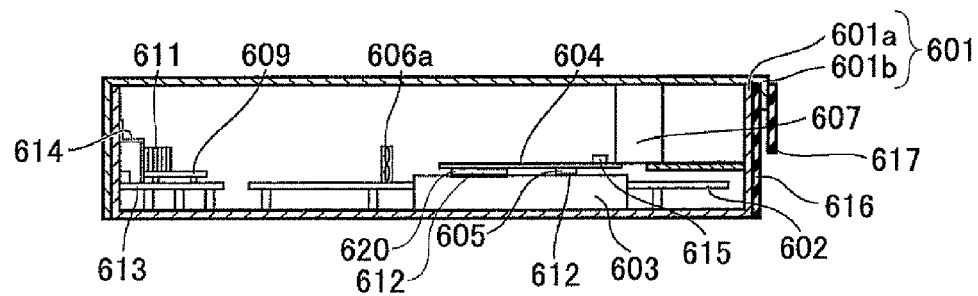
FIG. 10B is a vertical cross-sectional view of the control unit taken along the I-I line in FIG. 10A.
Figure 10C:
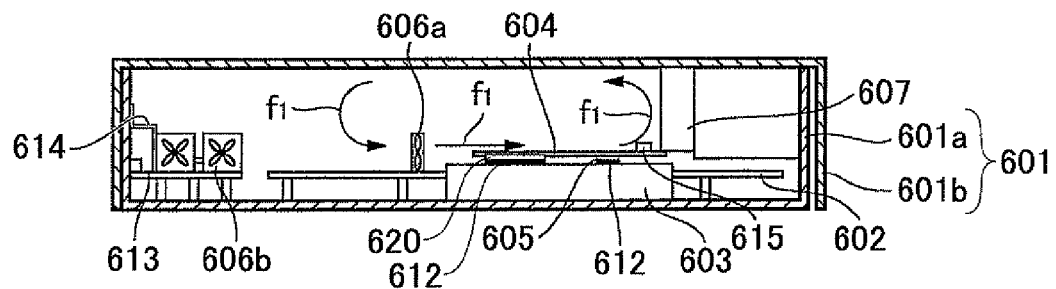
FIG. 10C is a vertical cross-sectional view of the control unit taken along the II-II line in FIG. 10A.
Figure 10D:
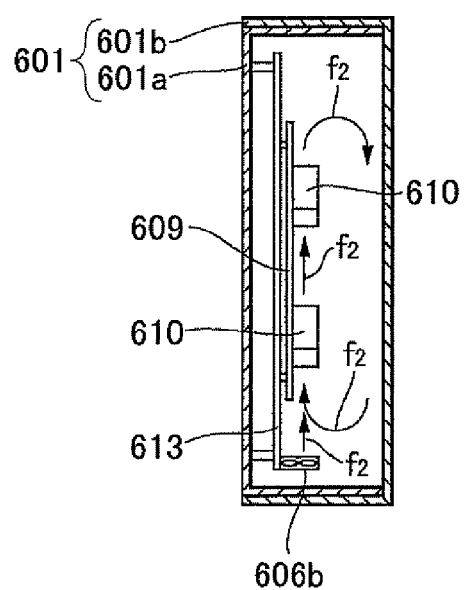
FIG. 10D is a vertical cross-sectional view of the control unit taken along the line in FIG. 10A.
Figure 11A:
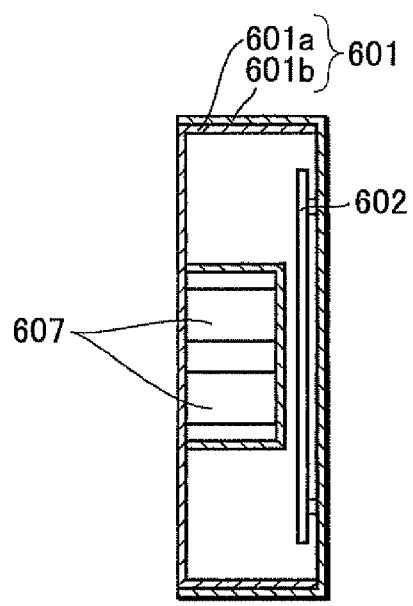
FIG. 11A is a vertical cross-sectional view of the control unit taken along the IV-IV line in FIG. 10A.
Figure 11B:
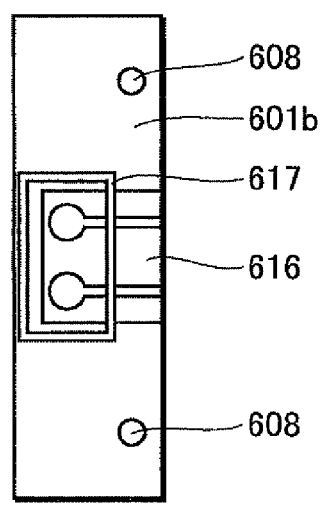
FIG. 11B is a side view of the control unit when viewed from the direction of the vertical cross-sectional view of FIG. 11A.

Next, the control unit 600 will be described with reference to FIGS. 10A-10D and FIGS. 11A and 11B. FIG. 10A is a horizontal cross-sectional view of the control unit 600. FIG. 10B is a vertical cross-sectional view of the control unit 600 taken along the I-I line in FIG. 10A. FIG. 10C is a vertical cross-sectional view of the control unit 600 taken along the II-II line in FIG. 10A. FIG. 10D is a vertical cross-sectional view of the control unit 600 taken along the III-III line in FIG. 10A. FIG. 11A is a vertical cross-sectional view of the control unit 600 taken along the IV-IV line in FIG. 10A. FIG. 11B is a side view of the control unit 600 when viewed from the direction of the vertical cross-sectional view of FIG. 11A.

The control unit 600 includes a housing 601 which has a housing container 601a and a housing cover 601b. The electronic circuits of the controller, etc. are accommodated in the housing 601.

The housing 601 of the control unit 600 has a configuration of a rectangular parallelepiped and is provided on the driver units 62-66 to cover the top surfaces of the driver units 62-66. The housing 601 includes an inner space in the form of a rectangular parallelepiped on the bottom having a flat surface in the form of a rectangle. The inner space is intercepted from the outside air and the housing 601 of the control unit 600 has an airtight structure. The direction (the first direction) in which the driver units are arrayed is in agreement with the transversal direction of the control unit 600, and this direction corresponds to the up/down direction of FIG. 10A. The direction (the second direction) which is perpendicular to the direction (the first direction) in which the driver units are arrayed is in agreement with the longitudinal direction of the control unit 600, and this direction corresponds to the right/left direction of FIG. 10A.

On the bottom in the housing 601, a card plate 602 having a rectangular shape is disposed. The card plate 602 is arranged so that the longitudinal direction and the transversal direction of the card plate 602 are consistent with the longitudinal direction and the transversal direction of the control unit 600, respectively. An opening having a rectangular shape is formed in the card plate 602.

The heat sink 603 having a configuration of a rectangular parallelepiped and having an top surface in the same shape as this opening shape is disposed in the opening of the card plate 602 on the bottom in the housing 601. The heat sink 603 is provided for cooling the electronic parts provided in the housing 601, and the cooling pipes 608 are arranged in contact with the heat sink 603.

The heat sink 603 is cooled with the liquid which is circulated through the cooling pipes 608. For example, this liquid is water. In order to avoid the complexity of the illustration in FIGS. 10B, 10C, and 11A, the illustration of the cooling pipes 608 in FIG. 10A is omitted.

A control card 604 having a rectangular shape is disposed on the heat sink 603. The control card 604 is a substrate for mounting various electronic parts thereon. On the control card 604, CPUs 605 and a CPU 620 are disposed as examples of the electronic parts. The CPUs 605 are processor units which correspond to the subordinate control unit which controls the drive of the motor generator 12, the subordinate control unit which controls the drive of the turning motor 21, and the subordinate control unit which controls the charging/discharging of the battery 19. The CPU 620 is a control module which controls the CPUs 605, and corresponds to the superordinate control module in the first embodiment. The CPUs 605 and the CPU 620 are in contact with the heat sink 603 via the heat-conduction sheet 612, and the surface of the control card 604 on which the CPUs 605 are mounted faces the heat sink 603 side. The CPU 620 and the CPUs 605 are connected together by the pattern wiring formed in the control card 604, and communicate with each other. Electrical components (not shown), such as electrical contacts, which generate the electric signals being supplied to electromagnetic valves, etc., are arranged on the surface of the control card 604 opposite to the mounting surface of the CPUs 605.

The input/output parts of the electronic parts mounted on the control card 604 are connected to the connector 607. For example, the command signals for operating the driver units 62-66, the output signals from the electronic parts, etc. are supplied to or received from the control card 604 via the connector 607. For example, the wiring of the connector 607 is connected to a control unit (not shown) which controls the servo control unit 60.

The connector 607 is disposed in the concave hollow portion on the side surface of the housing 601. The hollow portion is covered by a packing 616. The packing 616 is covered by a packing retainer 617 through a housing cover 601b. Using the packing 616, the connector 607 has a water-proofing/dust-proofing structure.

In order to control the up-down voltage converter unit 62 and the inverter units 63-66, the CPU 605 as the subordinate control unit is provided for each of the up-down voltage converter unit 62 and the inverter unit 63-66, and these units are arrayed in the transversal direction of the control unit 600. Because the CPU 605 is an electronic part constituted by various transistors, the CPU 605 has a very large heating value. In order to operate the CPU 605 normally, it is necessary to maintain the atmosphere of the CPU 605 in a predetermined range of temperatures. Because the CPU 605 is in contact with the heat sink 603 via the heat-conduction sheet 612, the heat generated in the CPU 605 can be partially absorbed by the heat sink 603, so that the CPU 605 can be cooled.

In order to operate these electronic parts normally, it is necessary that the temperature inside each control unit be maintained in a predetermined range. On the other hand, the control unit has an airtight structure which is adopted for waterproofing and dust-proofing of the electronic part. Because of the airtight structure, the heat generated in the control unit cannot be easily transmitted to the outside. If a temperature gradient in which a high temperature portion of the control unit is locally deviated arises, there is a possibility that an error occurs in the operation of the electronic parts.

A plurality of fans 606a are arrayed on the card plate 602 in the transversal direction of the control unit 600. The fans 606a are disposed for the CPUs 605, respectively, and arranged to generate the air flow in the direction toward each CPU 605 as indicated by the arrows f1. The direction of the air flow generated by the fans 606a is consistent with the longitudinal direction of the control unit 600. Because the air which is heated by the heat generated in the CPUs 605 can be agitated by the air flow generated by the fans 606a, the temperature gradient in the housing is eliminated. Therefore, the cooling efficiency in the housing improves and the abnormal operation of the electronic part due to high temperature can be prevented. The CPU 620 as a superordinate control unit is mounted on the control card 604, and the air heated by the heat generated in the CPU 620 can also be agitated, and the temperature gradient in the housing is eliminated.

A temperature sensor unit 615 is disposed for each of the CPUs 605 in the vicinity of each of the CPUs 605 in the control card 604. The temperature sensor unit 615 includes a temperature sensor and a fan control part. The bottom surfaces of the CPUs 605 are cooled by the heat sink 603, but the top surfaces of the CPUs 605 touch the control card 604. The heat generated in the CPUs 605 is transmitted to the control card 604 as well. The electrical components, such as electrical contacts, are mounted on the top surface of the control card 604. For this reason, the heat remains in the top surface of the control card 604. In order to detect a temperature of each CPU 605, each temperature sensor 615 is arranged on the top surface of the control card 604. The temperature sensor 615 detects a temperature in the vicinity of the CPU 605. The fan control part and the fans 606*a* are connected together by the wiring (not shown), and the fan control part compares a temperature detection value based on the detected temperature and a predetermined threshold, and controls each fan 606*a* based on the result of the comparison. For example, when the detected temperature in the vicinity of the CPU 605 is low enough for performing normal operation of the CPU 605, the fan control part controls each fan 606*a* to stop the operation of the fan 606*a*. Thereby, the life of the fans 606*a* can be increased.

A card plate 613 having a top surface in the form of a rectangle is disposed on the bottom in the housing 601. The card plate 613 is disposed near the internal surface of the housing 601 on the side which is opposite, when viewed from the card plate 602, to the side where the cooling pipes 608 are disposed. The longitudinal direction of the card plate 613 is consistent with the transversal direction of the control unit 600.

A power supply card 609 having a top surface in the form of a rectangle is disposed on the card plate 613. Two power supply ICs (power supply unit) 610 are arranged on the power supply card 609 in the longitudinal direction of the power supply card. A heat sink 611 is disposed on in each of the power supply ICs 610 for air cooling of the power supply IC. A heat-conduction plate 614 is arranged in contact with the internal surface of the housing 601, and the power supply ICs 610 and the heat sinks 611 are arranged in surface contact with the heat-conduction plate 614. Hence, the local deviation of the high temperature portion by the heat generated in the power supply ICs 610 can be eliminated.

Two fans 606*b* are arrayed on the card plate 613 in the transversal direction of the card plate 613. Both the fans 606*b* are arranged to generate the air flow in the direction toward each power supply IC 610 as indicated by the arrows f2. Because the air which is heated by the heat generated in the power supply ICs 610 can be agitated by the air flow, the temperature gradient in the housing is eliminated. Because it is possible to prevent the high temperature portion from being locally deviated, the life of the electrical components mounted on the high temperature portion can be increased.

Accordingly, in the hybrid construction machine of this embodiment, the fans 606*a* and 606*b* are arranged in the housing 601 of the control unit 600 to generate the air flow in the housing 601 having the airtight structure, and the air in the housing can be agitated by the air flow. Thereby, the temperature gradient in the housing is eliminated. Therefore, the abnormal operation of the electronic parts, such as the CPUs 605, due to the high temperature can be prevented.

When two or more CPUs are connected together by the cable wiring, a fall of the reliability due to damage of the cable wiring is conceivable. However, in this embodiment, two or more CPUs are contained in a single control card 604, and the CPUs are connected together by the pattern wiring formed in the control card 604. Thereby, there is no damage of the pattern wiring and the reliability of the servo control unit 60 can be raised.

In this embodiment, the servo control unit 60 is arranged so that the inverter units 63-66, the up-down voltage converter unit 62, and the control unit 600 are united. However, the present disclosure is not limited to this embodiment. Alternatively, the control unit 600 may be arranged such that the inverter units 63-66 and the up-down voltage converter unit 62 are separated from the control unit 600.

In this embodiment, the plural CPUs 605 are disposed between the control card 604 and the heat sink 603. However, the advantages of the present disclosure can be obtained by using at least one CPU.

In the above-mentioned embodiment, the CPU 620 as a superordinate control unit and the CPU 605 as a subordinate control unit are mounted on one control card 604, and the control card 604 is accommodated in the housing 601 of the control unit 600. Namely, the CPU 620 as a superordinate control unit and the CPU 605 as a subordinate control unit are accommodated in the same housing 601 in the above-mentioned embodiment. Alternatively, the CPU 605 as a subordinate control unit may be accommodated in each of the driver units 62-66 which has an airtight structure for waterproofing and dust-proofing purposes.

Specifically, for example, the CPU 605 as a subordinate control unit may be disposed in the up-down voltage converter unit 62 which controls the charging/discharging of the battery 19. The CPU 605 as a subordinate control unit may be disposed in the inverter unit 63 which controls the drive of the motor generator 12. The CPU 605 as a subordinate control unit may be disposed in the inverter unit 64 which controls the drive of turning motor 21. In this case, only the CPU 620 as a superordinate control unit is disposed on the control card 604 and none of the CPUs 605 as the subordinate control units is disposed.

Figure 12A:
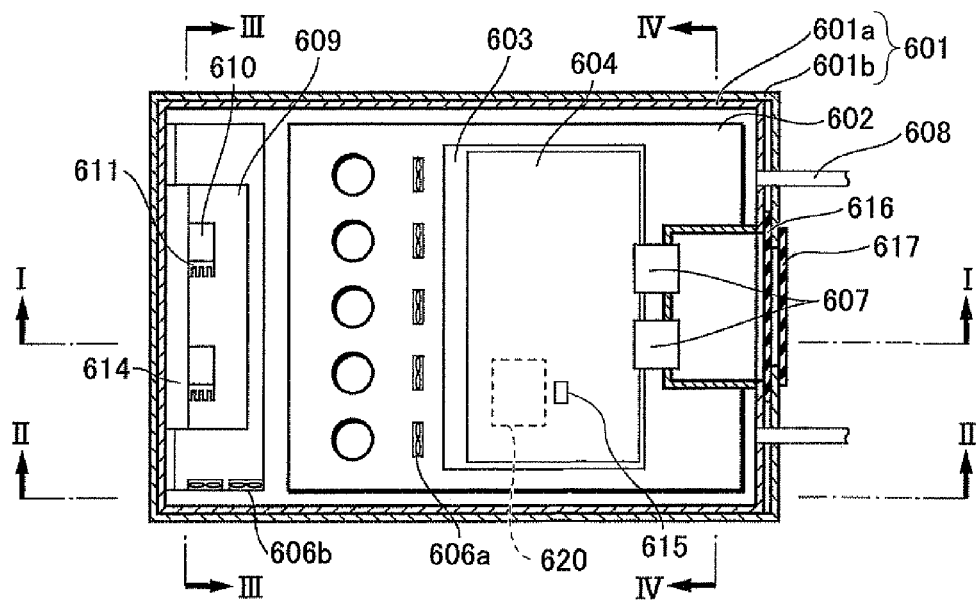
FIG. 12A is a horizontal cross-sectional view of a control unit in which only a superordinate control unit is arranged.
Figure 12B:
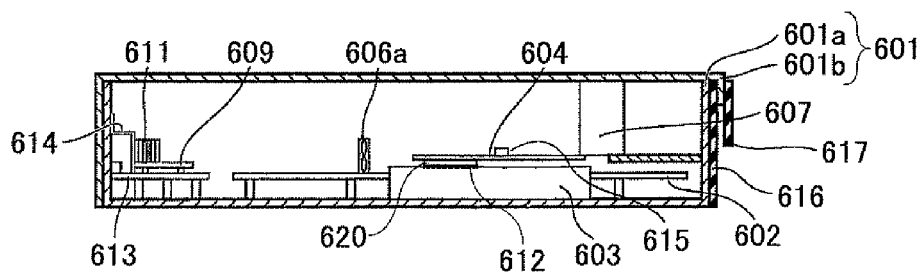
FIG. 12B is a vertical cross-sectional view of the control unit taken along the I-I line in FIG. 12A.
Figure 12C:
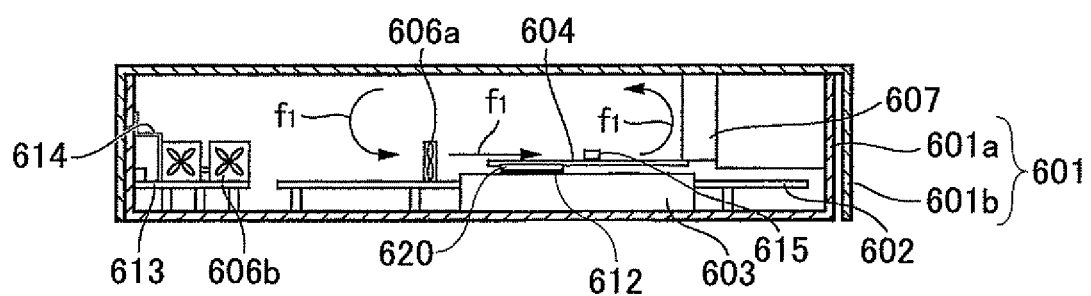
FIG. 12C is a vertical cross-sectional view of the control unit taken along the II-II line in FIG. 12A.

FIG. 12A is a horizontal cross-sectional view of the control unit 600 in which only the superordinate control unit is accommodated. FIG. 12B is a vertical cross-sectional view of the control unit taken along the I-I line in FIG. 12A. FIG. 12C is a vertical cross-sectional view of the control unit taken along the II-II line in FIG. 10A.

The CPU 620 as a superordinate control unit is mounted on the control card 604 in the control unit 600, but the CPU 605 as a subordinate control unit is not mounted.

Similar to the example shown in FIG. 10A, the plural fans 606*a* are arranged to generate the airflow to the whole control card 604. Alternatively, only one fan 606*a* may be arranged for the CPU 620. In such a case, one temperature sensor unit 615 may be arranged in the vicinity of the CPU 620.

As described above, the CPU 620 as a superordinate control unit and the CPU 605 as a subordinate control unit are arranged in different atmospheres. For example, even if the atmosphere (for example, a high temperature atmosphere) which may cause the CPU 620 as the superordinate control unit to malfunction, the atmosphere in which the CPU 605 as the subordinate control unit is arranged can be maintained to be a normal atmosphere. Thereby, even if the CPU 620 as the superordinate control unit malfunctions, the CPU 605 as the subordinate control unit functions normally, and the CPU 605 can perform the control of the respective parts of the lifting magnet type hydraulic excavator as a proxy control unit.

The present disclosure is not limited to the above-described embodiments, and variations and modifications may be made without departing from the scope of the present disclosure.

The present international application is based on and claims the benefit of priority of Japanese patent application No. 2008-306731, filed on Dec. 1, 2008, and Japanese patent application No. 2009-010257, filed on Jan. 20, 2009, the contents of which are incorporated herein by reference in their entirety.

INDUSTRIAL APPLICABILITY

The present disclosure is applicable to a hybrid construction machine in which drive of an engine is assisted by an electric motor.

DESCRIPTION OF THE REFERENCE NUMERALS 1 lower running part
1A, 1B running device
2 turning device
3 upper turning part
4 boom
5 arm
6 lifting magnet
7 boom cylinder
8 arm cylinder
9 bucket cylinder
10 cabin
11 engine
12 motor generator
13 reduction gear
14 main pump
15 pilot pump
16 high-voltage hydraulic line
17 control valve
18, 18A, 18B, 20 inverter
19 battery
21 turning motor
22 Resolver
23 mechanical Brake
24 turning reduction gear
25 pilot line
26 operation device
26A, 26B lever
26C pedal
26D button switch
27 hydraulic line
28 hydraulic line
29 pressure sensor
30 controller
60 servo control unit
62-66 driver unit
100 up-down voltage converter
110 DC bus
111 DC bus voltage detector
112 battery voltage detector
113 battery current detector
210 tank
220 cooling water pump
221 pump motor
222 pump inverter
230 radiator
240 power supply system
300 pump motor
310 inverter
600 control unit
601 housing
602 card plate
603 heat sink
604 control card
605, 620 CPU
606a, 606b fan
607 connector
608 cooling pipe
609 power supply card
610 power supply IC
611 heat sink
612 heat-conduction sheet
613 card plate
614 heat-conduction plate
615 temperature sensor unit

The invention claimed is:

1. A hybrid construction machine including a hydraulic pressure work element driven by hydraulic pressure generated by driving power of an internal combustion engine or a motor generator, and an electric-motor work element driven by an electric motor, the hybrid construction machine comprising:
a superordinate control unit configured to generate a control command which is configured to control drive of the hydraulic pressure work element and the electric-motor work element; and
a plurality of subordinate control units configured to control the drive of the hydraulic pressure work element and the electric-motor work element based on the control command generated by the superordinate control unit, wherein the subordinate control units are configured to monitor an error in the superordinate control unit.

2. The hybrid construction machine according to claim 1, further comprising:
a plurality of the hydraulic pressure work elements; and
a plurality of the electric-motor work elements,
wherein each of the subordinate control units is arranged in each of one or the plurality of hydraulic pressure work elements and one or the plurality of electric-motor work elements in the hybrid construction machine, and each of the subordinate control units is configured to perform, when the error in the superordinate control unit is detected, an error-corrective control process in response to an operational status of a corresponding one of the hydraulic pressure work elements or the electric-motor work elements.

3. The hybrid construction machine according to claim 2, wherein the superordinate control unit comprises a plurality of superordinate control modules which are configured to correspond to the subordinate control units respectively.

4. The hybrid construction machine according to claim 3, wherein the superordinate control unit comprises an electricity accumulating system superordinate control module which is configured to generate a control command which is configured to control drive of an electricity accumulating system in the hybrid construction machine, which module is one of the plurality of superordinate control modules is included, and one of the subordinate control units is an electricity accumulating system subordinate control unit which is configured to control the drive of the electricity accumulating system based on the control command generated by the electricity accumulating system superordinate control module, and, when an error in the electricity accumulating system superordinate control module is detected, the electricity accumulating system subordinate control unit is configured to stop charging/discharging control of the electricity accumulating system after a predetermined time is elapsed.

5. The hybrid construction machine according to claim 4, wherein the superordinate control unit comprises a rotary machine superordinate control module which is configured to generate a control command which is configured to control drive of a rotary machine among the electric-motor work elements, which module is one of the superordinate control modules, and one of the subordinate control units is a rotary machine subordinate control unit which is configured to control the drive of the rotary machine based on the control command generated by the rotary machine superordinate control module, and when an error in the rotary machine superordinate control module is detected, the rotary machine subordinate control unit is configured to stop the drive of the rotary machine.

6. The hybrid construction machine according to claim 4, further comprising:
a hydraulic pump output subordinate control unit which is configured to control an output of a hydraulic pump which is configured to generate hydraulic pressure which drives the hydraulic pressure work element,
wherein the superordinate control unit further comprises a hydraulic pump superordinate control module which is configured to generate a control command which is configured to control the output of the hydraulic pump to the hydraulic pump output subordinate control unit, and, when an error in the hydraulic pump superordinate control module is detected, the hydraulic pump output subordinate control unit is configured to reduce the output of the hydraulic pump to a predetermined output.

7. The hybrid construction machine according to claim 3, wherein the superordinate control unit comprises a rotary machine superordinate control module which is configured to generate a control command which is configured to control drive of a rotary machine among the electric-motor work elements, which module is one of the superordinate control modules, and one of the subordinate control units is a rotary machine subordinate control unit which is configured to control the drive of the rotary machine based on the control command generated by the rotary machine superordinate control module, and when an error in the rotary machine superordinate control module is detected, the rotary machine subordinate control unit is configured to stop the drive of the rotary machine.

8. The hybrid construction machine according to claim 3, wherein the superordinate control unit comprises a lifting magnet superordinate control module which is configured to generate a control command which is configured to control drive of a lifting magnet among the electric-motor work elements, which module is one of the superordinate control modules, and one of the subordinate control units is a lifting magnet subordinate control unit which is configured to control the drive of the lifting magnet based on the control command generated by the lifting magnet superordinate control module, and when an error in the lifting magnet superordinate control module is detected, the lifting magnet subordinate control unit is configured to inhibit attraction operation of the lifting magnet if the lifting magnet is not in an attraction state, and holds attraction operation of the lifting magnet if the lifting magnet is in an attraction state.

9. The hybrid construction machine according to claim 3, wherein the superordinate control unit comprises an engine superordinate control module which is configured to generate a control command which is configured to control drive of the internal combustion engine, which module is one of the superordinate control modules, and one of the subordinate control units is an engine subordinate control unit which is configured to control the drive of the internal combustion engine based on the control command generated by the engine superordinate control module, and when an error in the engine superordinate control module is detected, the engine subordinate control unit is configured to continue the drive of the internal combustion engine.

10. The hybrid construction machine according to claim 3, further comprising:
a cooling system subordinate control unit which is configured to control drive of an electric cooling pump which is configured to circulate cooling water in an electric power system of the hybrid construction machine,
wherein the superordinate control unit further comprises a cooling system superordinate control module which is configured to generate a control command which is configured to control the drive of the electric cooling pump to the cooling system subordinate control unit, and, when an error in the cooling system superordinate control module is detected, the cooling system subordinate control unit is configured to continue the drive of the electric cooling pump.

11. The hybrid construction machine according to claim 3, further comprising:
a hydraulic pump output subordinate control unit which is configured to control an output of a hydraulic pump which is configured to generate hydraulic pressure which drives the hydraulic pressure work element,
wherein the superordinate control unit further comprises a hydraulic pump superordinate control module which is configured to generate a control command which is configured to control the output of the hydraulic pump to the hydraulic pump output subordinate control unit, and, when an error in the hydraulic pump superordinate control module is detected, the hydraulic pump output subordinate control unit is configured to reduce the output of the hydraulic pump to a predetermined output.

12. The hybrid construction machine according to claim 1, further comprising:
a control unit which is configured to control a driver unit including an inverter unit which drives the electric-motor work element, the control unit comprising:
a housing having an airtight structure;
an electronic part provided in the housing; and
a first fan provided in the housing to agitate air in the housing.

13. The hybrid construction machine according to claim 12, wherein the electronic part, provided in the housing, includes a superordinate control module which is configured to control a CPU which is configured to function as the subordinate control unit which is configured to control the driver unit, and the first fan is arranged to generate an air flow directed to the superordinate control module.

14. The hybrid construction machine according to claim 13, wherein the electronic part, provided in the housing, includes a CPU which is configured to function as the subordinate control unit, and the first fan is arranged to generate an air flow directed to a CPU which is configured to function as the superordinate control module and the subordinate control unit.

15. The hybrid construction machine according to claim 13,
wherein the control unit further comprises a temperature sensor which is configured to measure a temperature of the CPU and the superordinate control module, and the first fan is controlled based on the temperature measured by the temperature sensor.

16. The hybrid construction machine according to claim 12,
wherein the control unit further comprises:
a power supply unit configured to supply electric power to the electronic part; and
a second fan provided in the housing configured to generate an air flow directed to the power supply unit.

17. A hybrid construction machine including a hydraulic pressure work element driven by hydraulic pressure generated by driving power of an internal combustion engine or a motor generator, an electric-motor work element driven by an electric motor, and an electricity accumulating system element for accumulating electricity, the hybrid construction machine comprising:
a superordinate control unit configured to generate a control command which is configured to control drive of the electric-motor work element and the electricity accumulating system element; and
a plurality of subordinate control units configured to control drive of the electric-motor work element and the electricity accumulating system element based on the control command generated by the superordinate control unit, wherein the subordinate control units are configured to monitor an error in the superordinate control unit.

18. The hybrid construction machine according to claim 17,
wherein the electric-motor work element includes a plurality of electric-motor work elements,
the electricity accumulating system element includes a plurality of electricity accumulating system elements, and
each of the subordinate control units is arranged in each of one or the plurality of electric-motor work elements and one or the plurality of the electricity accumulating system elements in the hybrid construction machine, and each of the subordinate control units is configured to perform, when the error in the superordinate control unit is detected, an error-corrective control process in response to an operational status of a corresponding one of the electric-motor work elements or the electricity accumulating system elements.

* * * * *